(12) United States Patent
Raza et al.

(10) Patent No.: US 11,579,238 B2
(45) Date of Patent: Feb. 14, 2023

(54) LOCALIZATION AND COMMUNICATION SYSTEMS AND METHODS

(71) Applicant: Kabushiki Kaisha Toshiba, Tokyo (JP)

(72) Inventors: Usman Raza, Bristol (GB); James Pegg, Bristol (GB); Roget Kou, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1 day.

(21) Appl. No.: 17/335,543

(22) Filed: Jun. 1, 2021

(65) Prior Publication Data
US 2022/0381871 A1    Dec. 1, 2022

(51) Int. Cl.
G01S 5/02 (2010.01)
H04W 64/00 (2009.01)
H04L 5/00 (2006.01)
G01S 13/02 (2006.01)

(52) U.S. Cl.
CPC ........ *G01S 5/0284* (2013.01); *G01S 13/0209* (2013.01); *H04L 5/0044* (2013.01); *H04W 64/006* (2013.01)

(58) Field of Classification Search
CPC . G01S 5/0284; G01S 13/0209; H04L 5/0044; H04W 64/006
See application file for complete search history.

(56) References Cited

U.S. PATENT DOCUMENTS

2016/0353238 A1* 12/2016 Gherardi ............... H04W 84/18

OTHER PUBLICATIONS

Tiemann et al., "ATLAS FaST: Fast and Simple Scheduled TDOA for Reliable Ultra-Wideband Localization", 2019 IEEE International Conference on Robotics and Automation (ICRA), 2019, 7 pages.
Grosswindhager et al., "SnapLoc: An Ultra-Fast UWB-Based Indoor Localization System for an Unlimited Number of Tags", 2019 18th ACM/IEEE International Conference on Information Processing in Sensor Networks (IPSN), 2019, 12 pages.
(Continued)

*Primary Examiner* — Curtis B Odom
(74) *Attorney, Agent, or Firm* — Oblon, McClelland, Maier & Neustadt, L.L.P.

(57) ABSTRACT

A method is provided for localizing mobile tags using a system including a plurality of anchors located at known locations, the method including: transmitting a plurality of ultra-wideband (UWB) localization packets using respective anchors of the plurality of anchors, in which each of the plurality of localization packets is transmitted by a respective anchor of the plurality of anchors at a different respective delay time; and transmitting an update UWB packet with either an anchor of the plurality of anchors that does not transmit one of the localization packets, or with a mobile tag, in which the localization packets include no payloads, the update packet includes a payload, and in which successive ones of the plurality of localization packets and the update packet overlap with each other in time. A system for localizing mobile tags is also provided.

20 Claims, 9 Drawing Sheets

(56) References Cited

OTHER PUBLICATIONS

Corbalán et al., "Chorus: UWB Concurrent Transmissions for GPS-like Passive Localization of Countless Targets", 2019 18$^{th}$ ACM/IEEE International Conference on Information Processing in Sensor Networks (IPSN), 2019, 12 pages.

Decawave "DW 1000 Product Brief", DecaWave Ltd., https://www.decawave.com/dw1000/productbrief/, 2013, 2 pages.

Petitti et al., "Decentralized Motion Control for Cooperative Manipulation with a Team of Networked Mobile Manipulators", 2016 IEEE International Conference on Robotics & Automation (ICRA), May 2016, 7 pages.

* cited by examiner

LOCALIZATION AND COMMUNICATION SYSTEMS AND METHODS

FIELD

Embodiments described herein relate to methods and systems for communicating with and/or localizing targets using wireless signals, and to cellular arrangements of localisation and/or communication systems.

BACKGROUND

Indoor wireless localization systems are systems for determining or estimating the location of one or more targets, such as people, objects, or electronic devices in indoor locations, where outdoor localization systems such as the satellite based global position system (GPS), may be imprecise or unusable. Such systems are utilized in smart homes, geo-fencing, warehouses, health care situations, or other industrial situations.

Arrangements of the embodiments will be understood and appreciated fully from the following detailed description, made by way of example only and taken in conjunction with the drawings in which.

Figure 6:
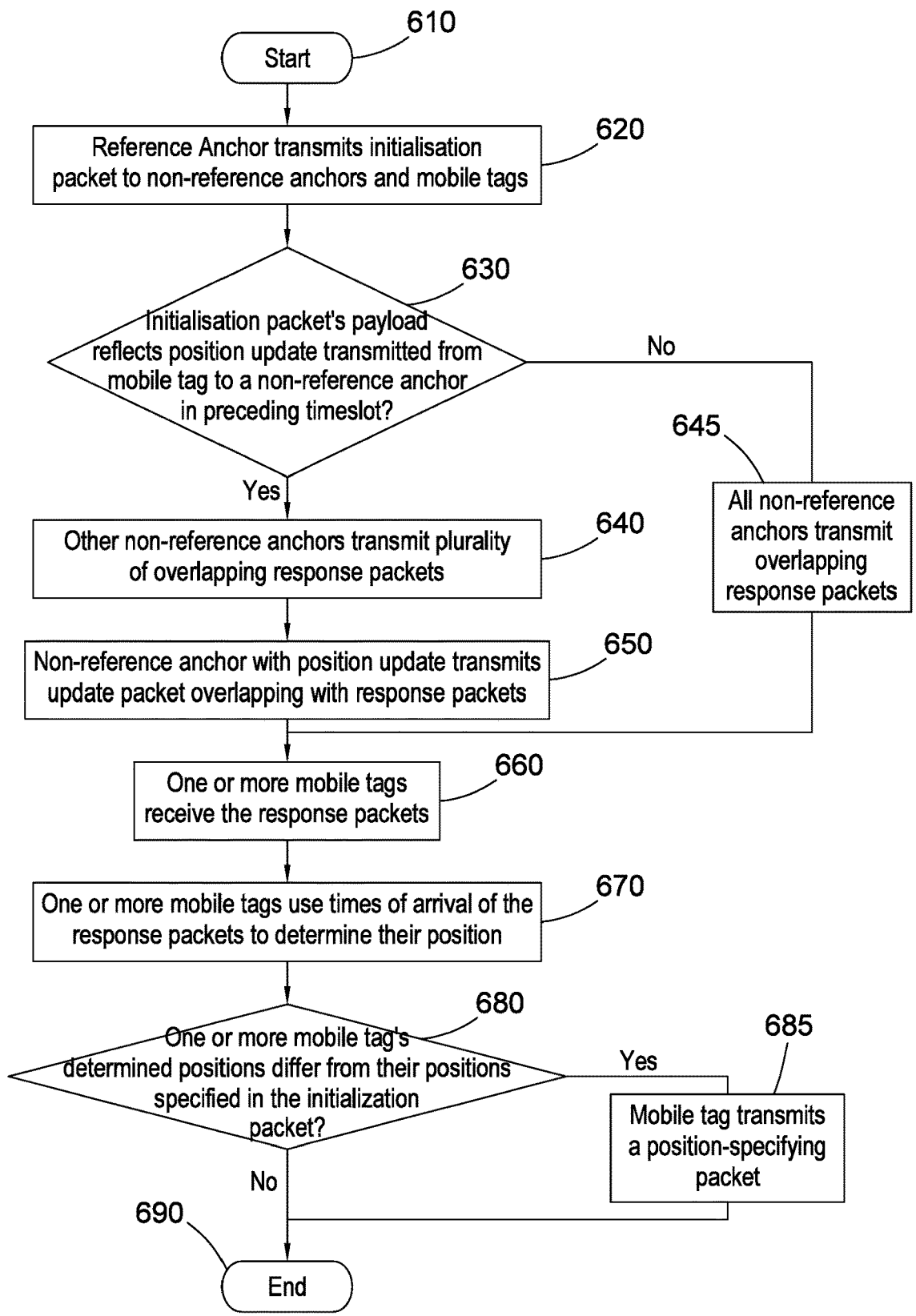
FIG. 6 is a flow chart of a second example embodiment of a method.
Figure 7A:
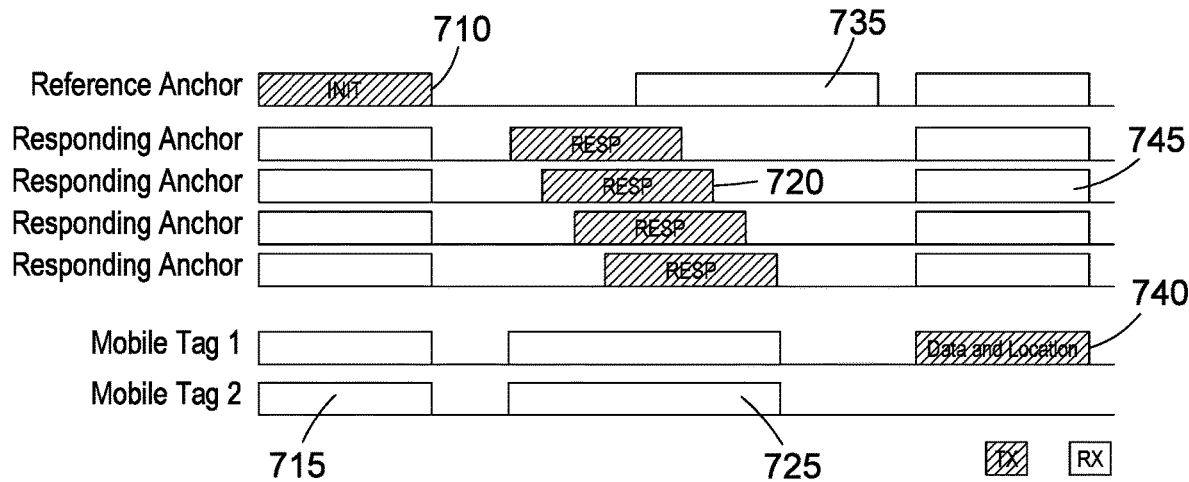
Figure 7B:
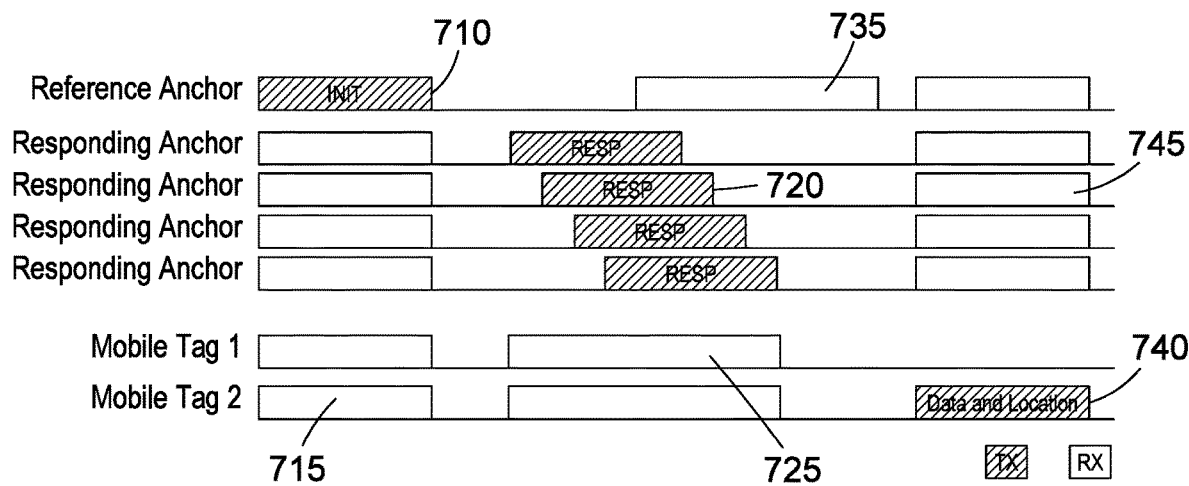
Figure 7C:
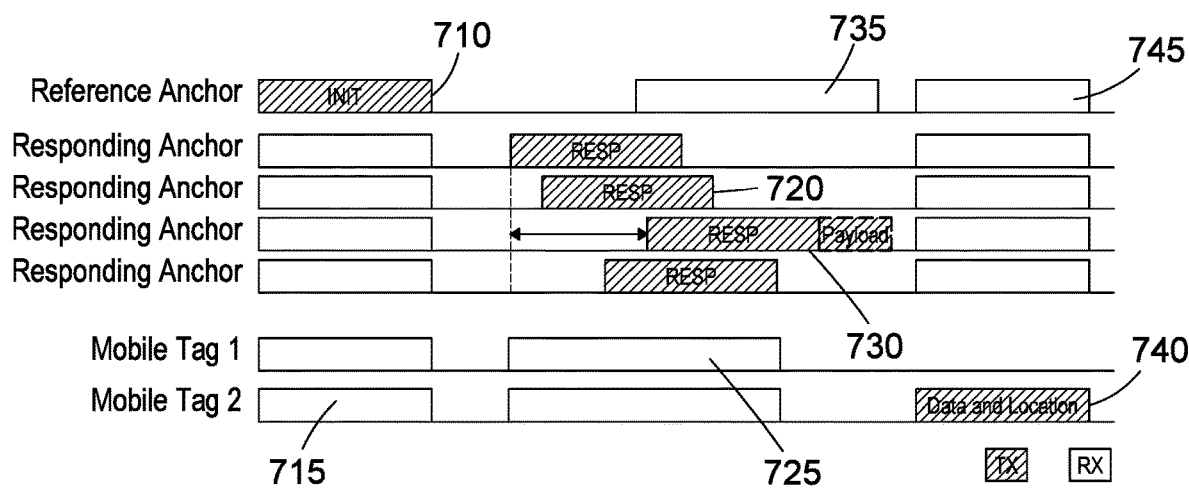
Figure 8:
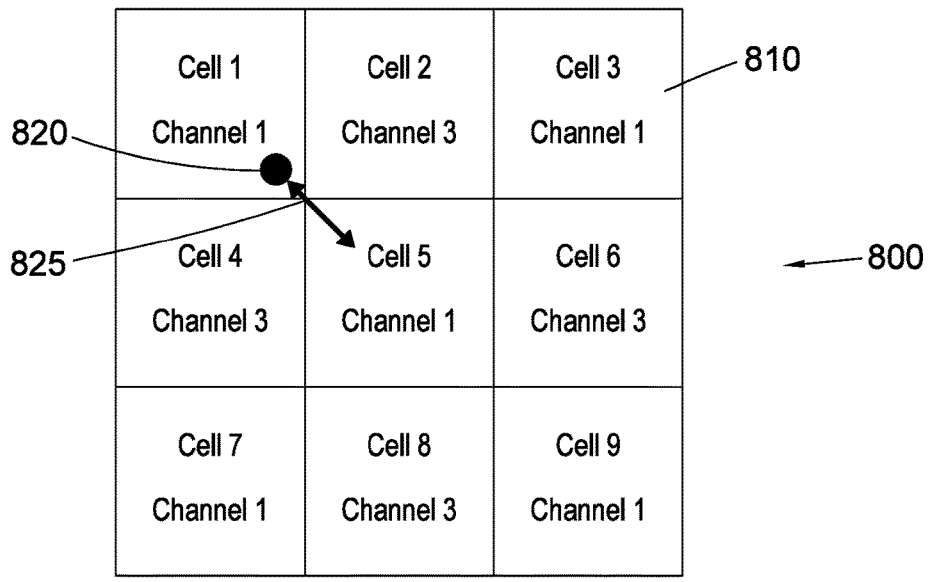
Figure 9:
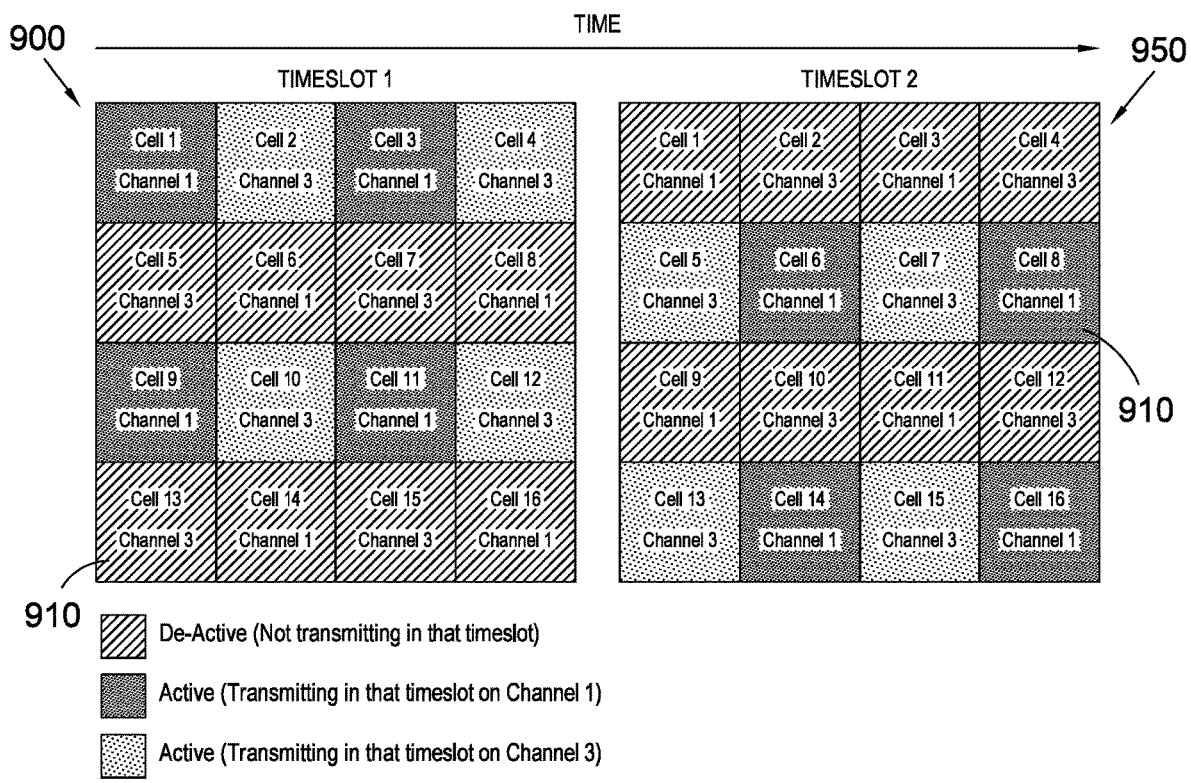
Figure 10:
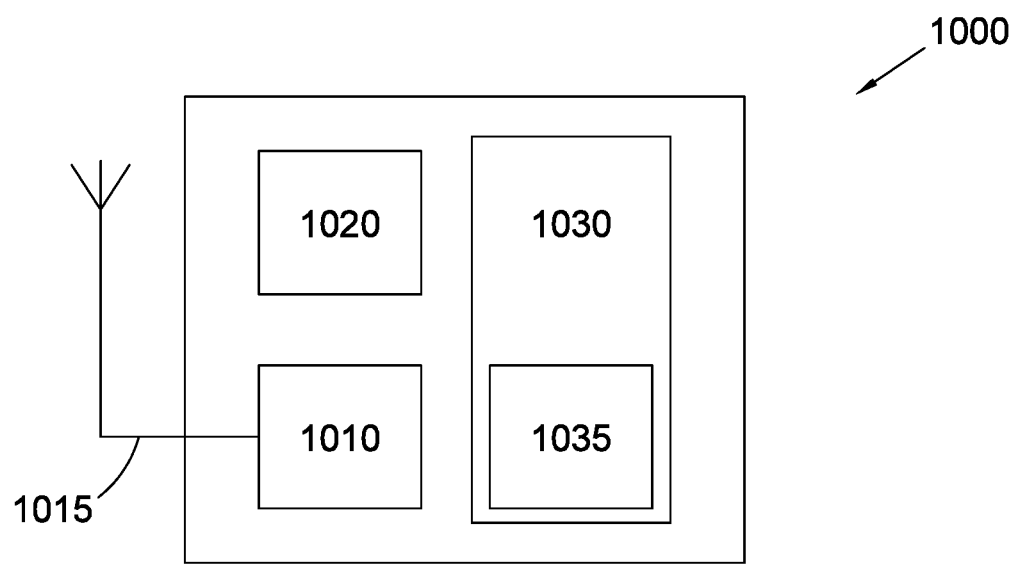

FIGS. 7a, 7b, and 7c show first, second and third timeslot in which the method of FIG. 6 is performed;

FIG. 8 shows an arrangement of cells covered by localisation and communication method operating using two channels;

FIG. 9 shows an arrangement of cells covered by localisation and communication method operating using two channels and two timeslots; and FIG. 10 shows a device configured to perform steps of localisation and communication operations.

DETAILED DESCRIPTION

According to an embodiment there is provided a method for localising mobile tags using a system comprising a plurality of anchors located at known locations. The method comprises: transmitting a plurality of ultra-wideband, UWB, localisation packets using respective anchors of the plurality of anchors, wherein each of the plurality of localisation packets is transmitted by a respective anchor of the plurality of anchors at a different respective delay time; and transmitting an update UWB packet with either an anchor of the plurality of anchors that does not transmit one of the localisation packets, or with a mobile tag. Wherein the localisation packets comprise no payloads, the update packet comprises a payload, and wherein successive ones of the plurality of localisation packets and the update packet overlaps with each other in time.

In use, one or more mobile tags may advantageously listen for and receive the overlapping payload-less localisation packets and payload-carrying update packet within a narrow timeframe. This advantageously allows such mobile tags to simultaneously determine their locations using the times of arrival of the localisation packet and to communicate with another mobile tag or anchor.

In an embodiment the method may be used to communicate locations of mobile tags determined in previous timeslots, for example, to further mobile tags and/or anchors that listen to receive the overlapping localisation packets and update packet.

The method may further comprise: receiving the plurality of localisation packets at a mobile tag, determining the times of arrival of each of the plurality of localisation packets at the mobile tag from respective channel impulse response peaks with which the plurality of localisation packets were received at the mobile tag; identifying which of the plurality of anchors transmitted each of the plurality of localisation packets based on at least one of the order in which the plurality of localisation packets were received by the mobile tag or time windows in which the plurality of localisation packets were received by the mobile tag; and using the times of arrival or time differences of arrival of the plurality of localisation packets and the known locations of the anchors to determine the location of the mobile tag using multilateration.

The respective delay times at which the plurality of localisation packets may be transmitted by respective anchors are separated from each other by at least a time offset equal to a distance between two anchors of the plurality of anchors divided by the speed of light.

The update packet may be transmitted after the plurality of localisation packets.

A separation in time between the transmission of the earliest of the plurality of localisation packets and the transmission of the update packet may be less than a period for which the mobile tag measures its channel impulse response when receiving the overlapping localisation packets and update packet.

An anchor of the plurality of anchors may be a reference anchor. The method may further comprise transmitting an UWB initialisation packet with the reference anchor before the transmission of the plurality of localisation packets and the update packet. The initialisation packet may be received by each of the plurality of anchors that transmit respective localisation packets, and by the anchor or mobile tag that transmits the update packet.

In some embodiments, the system may include one or more mobile tags. In such embodiments, if the update packet is transmitted with a mobile tag, it may transmitted by one of said one or more mobile tags. The initialisation packet may comprise a payload including information identifying a most recent position known to the reference anchor of at least one of the one or more mobile tags; and the payload of the update packet may include information identifying a position of at least one of the one or more mobile tags that is not identified in the information of the payload of the initialisation packet.

At least one of the plurality of anchors and the one or more mobile tags may receive the initialisation packet, may determine whether it knows a position of a mobile tag of the one or more mobile tags that is not indicated in the payload of the initialisation packet, and if it does know a position of a mobile tag of the one or more mobile tags that is not indicated in the payload of the initialisation packet, transmit the update packet, wherein the payload comprised by the update packet contains information indicating said position.

In some embodiments, some or all of the plurality of anchors and the one or more mobile tags that receive the initialisation packet may determine whether they know a positon of a mobile tag of the one or more mobile tags that is not indicated in the payload of the initialisation packet. If they do, they may transmit the update packet, wherein the payload comprised by the update packet contains information indicating said position. Each of the plurality of anchors that receives the initialisation packet and determines that it does not know a positon of a mobile tag that is not indicated in the payload thereof may transmit a respective localisation packet of the plurality of localisation packets. Each of the one or more mobile tags that receives the initialisation packet and determines that it does not know a positon of a mobile tag that is not indicated in the payload thereof may listen to receive the plurality of localisation packets.

The initialisation packet may be received by at least one of the one or more mobile tags and the update packet may be transmitted by at least one of the one or more mobile tags which determined its position in a previous timeslot.

The update packet may be transmitted by one of the anchors of the plurality of anchors which received a position update transmitted by a mobile tag of the one or more mobile tags in a previous timeslot.

According to an embodiment, there is provided a system for localising mobile tags. The system comprises a plurality of anchors positioned at known locations configured to transmit respective ultra-wideband, UWB, localisation packets at different respective delay times; and one or more mobile tags configured to receive the localisation packets. At least one of the one or more mobile tags is configured to transmit an update packet instead of receiving the localisation packets and/or at least one of the plurality of non-reference anchors is configured to transmit an update packet instead of transmitting one of the localisation packets. The localisation packets comprise no payloads, the update packet comprises a payload, and successive ones of the plurality of localisation packets and the update packet overlap with each other in time.

The one or more mobile tags may be configured to listen for and receive overlapping payload-less localisation packets and payload-carrying update packet within a narrow timeframe.

The system may advantageously allow the locations of the mobile tags determined in previous timeslots to be communicated, for example, to further mobile tags and/or anchors that listen to receive the overlapping localisation packets and update packet.

The one or more mobile tags may be further configured to determine the times of arrival of each of the plurality of localisation packets at the mobile tag from respective channel impulse response peaks with which the plurality of localisation packets were received at the mobile tag. The one or more mobile tags may be further configured to identify which of the plurality of anchors transmitted each of the plurality of localisation packets based on at least one of the order in which the plurality of localisation packets were received by the mobile tag or time windows in which the plurality of localisation packets were received by the mobile tag. The one or more mobile tags may be further configured to use the times of arrival or time differences of arrival of the plurality of localisation packets and the known locations of the anchors to determine the location of the mobile tag using multilateration.

The respective delay times at which the plurality of anchors are configured to transmit the respective localisation packets may be separated from each other by at least a time offset equal to a distance between two anchors of the plurality of anchors divided by the speed of light.

The at least one of the one or more mobile tags and/or of the plurality of non-reference anchors may be configured to transmit the update packet after the respective delay times.

A separation in time between the transmission of the earliest of the plurality of localisation packets and the transmission of the update packet may be less than a period for which the mobile tags measure their channel impulse response when receiving the overlapping localisation packets and update packet.

The system may further comprise a reference anchor configured to transmit a UWB initialisation packet before the transmission of the plurality of localisation packets and the update packet. The plurality of other anchors and the one or more mobile tags may be configured to receive the initialisation packet.

The initialisation packet may comprise a payload including information identifying a most recent position known to the reference anchor of at least one of the one or more mobile tags; and the payload of the update packet may include information identifying a position of at least one of the one or more mobile tags that is not identified in the information of the payload of the initialisation packet.

At least one of the plurality of anchors and the one or more mobile tags may be configured to receive the initialisation packet, to determine whether it knows a position of a mobile tag of the one or more mobile tags that is not indicated in the payload of the initialisation packet, and if it does know a position of a mobile tag of the one or more mobile tags that is not indicated in the payload of the initialisation packet, to transmit the update packet, wherein the payload comprised by the update packet contains information indicating said position.

In some embodiments, some or all of the plurality of anchors and the one or more mobile tags are configured to receive the initialisation packet, determine whether they know a positon of a mobile tag of the one or more mobile tags that is not indicated in the payload of the initialisation packet, and if they do, transmit the update packet, wherein the payload comprised by the update packet contains information indicating said position. Each of the plurality of anchors that receives the initialisation packet and determines that it does not know a positon of a mobile tag that is not indicated in the payload thereof may transmit a respective localisation packet of the plurality of localisation packets. Each of the one or more mobile tags that receives the initialisation packet and determines that it does not know a positon of a mobile tag that is not indicated in the payload thereof may listen to receive the plurality of localisation packets.

At least one of the one or more mobile tags may be configured to receive the initialisation packet and may be configured to transmit update packet after having determined its position during a previous timeslot.

At least one of the plurality of anchors may be configured to receive the initialisation packet and to transmit the update packet after having received a position update transmitted by a mobile tag of the one or more mobile tags transmitted during an previous timeslot.

According to an embodiment, there is provided one or more non-transitory storage media comprising computer instructions executable by one or more processing means of an anchor. The computer instructions when executed by the one or more processing means causing the anchor to: adopt a respective delay time of a plurality of pre-set delay times; if no information for transmission is present in the anchor, transmit, at the respective delay time, an ultra-wideband, UWB, localisation packet comprising no payload; if information for transmission is present in the anchor, transmit an UWB update packet that comprises a payload, at a time that differs by less than a duration of a payload-less UWB packet from each of the plurality of pre-set delay times; the payload including the information.

According to an embodiment, there is provided one or more non-transitory storage media comprising computer instructions executable by one or more processing means of a mobile tag. The computer instructions when executed by the one or more processing means causing the mobile tag to: store a plurality of respective locations of a plurality of anchors and a plurality of respective pre-set delay times adopted by the plurality of anchors, if information for transmission is present in the mobile tag, transmit an ultra-wideband, UWB, update packet that comprises a payload at a time within a range from an earliest delay time of the stored plurality of respective pre-set delay times to a time that is a duration of a payload-less UWB packet after a latest delay time of the stored plurality of respective pre-set delay times; and if information for transmission is not present in the mobile tag, listen for and receive a plurality of UWB localisation packets comprising no payloads, each transmitted at one of the stored plurality of respective pre-set delay times; determine respective times of arrival at which the mobile tag receives each of the respective localisation packets; identify an anchor of the plurality of anchors that is most likely to have transmitted each of the plurality of localisation packets at its respective delay time based on the order and/or time windows in which the plurality of localisation packets are received by the mobile tag; using the times of arrival or time differences of arrival of the plurality of localisation packets and the stored locations of the plurality of anchors to determine a location of the mobile tag using multilateration.

According to an embodiment, there is provided an anchor configured to: adopt a respective delay time of a plurality of pre-set delay times; if no information for transmission is present in the anchor, transmit, at the respective delay time, an ultra-wideband, UWB, localisation packet comprising no payload; if information for transmission is present in the anchor, transmit an UWB update packet that comprises a payload, at a time that differs by less than a duration of a payload-less UWB packet from each of the plurality of pre-set delay times; the payload including the information.

According to an embodiment, there is provided a mobile tag configured to: store a plurality of respective locations of a plurality of anchors and a plurality of respective pre-set delay times adopted by the plurality of anchors, if information for transmission is present in the mobile tag, transmit an ultra-wideband, UWB, update packet that comprises a payload at a time within a range from an earliest delay time of the stored plurality of respective pre-set delay times to a time that is a duration of a payload-less UWB packet after a latest delay time of the stored plurality of respective pre-set delay times; and if information for transmission is not present in the mobile tag, listen for and receive a plurality of UWB localisation packets comprising no payloads, each transmitted at one of the stored plurality of respective pre-set delay times; determine respective times of arrival at which the mobile tag receives each of the respective localisation packets; identify an anchor of the plurality of anchors that is most likely to have transmitted each of the plurality of localisation packets at its respective delay time based on the order and/or time windows in which the plurality of localisation packets are received by the mobile tag; using the times of arrival or time differences of arrival of the plurality of localisation packets and the stored locations of the plurality of anchors to determine a location of the mobile tag using multilateration.

The mobile tag, anchor, or computer instructions for an anchor or mobile tag may comprise any of the optional features of the method or system described above.

According to an embodiment there is provided a system for localising mobile tags within an environment divided into a plurality of cells, the system comprising a plurality of subsystems; wherein each of the subsystems covers one of the cells and is configured to transmit ultra-wideband, UWB, localisation packets with a plurality of respective anchors for localising a mobile tag within that cell using multilateration; wherein different subsystems transmit localisation packets at different frequencies.

Each of the subsystems covering a cell may transmit localisation packets at frequencies that do not overlap with frequencies at which a different subsystem covering a neighbouring cell to that cell transmit localisation packets.

The system may comprise one or more mobile tags, wherein each of the mobile tags is configured to listen to receive localisation packets at all of the frequencies at which the different subsystems transmit localisation packets.

Different subsystems may transmit localisation packets in different timeslots.

A first group of the subsystems may transmit localisation packets at first frequencies and a second group of the subsystems may transmit localisation packets at second frequencies that do not overlap with the first frequencies. At least one of the each of the first and second groups of subsystems may transmit localisation packets in first timeslots and at least one of the each of the first and second groups of subsystems may transmit localisation packets in second timeslots that are interleaved with the first timeslots.

Some or all of the subsystems may be systems for localising and communicating with mobile tags as described above, and may comprise any of the suitable optional features thereof.

According to an embodiment there is provided a method for localising mobile tags within an environment divided into a plurality of cells, the method comprising transmitting a plurality of ultra-wideband, UWB, localisation packets with respective anchors of each of a plurality subsystems, each covering one of the cells; wherein the localisation packets transmitted by each subsystem are for localising a mobile tag within the cell covered by that subsystem using multilateration, and wherein different subsystems transmit localisation packets at different frequencies.

Each of the subsystems covering a cell may transmit localisation packets at frequencies that do not overlap with frequencies at which a different subsystem covering a neighbouring cell to that cell transmit localisation packets.

The method may comprise listening to receive localisation packets at all of the frequencies at which the different subsystems transmit localisation packets with one or more mobile tags.

Different subsystems may transmit localisation packets in different timeslots.

A first group of the subsystems may transmit localisation packets at first frequencies and a second group of the subsystems may transmit localisation packets at second frequencies that do not overlap with the first frequencies. At least one of the each of the first and second groups of subsystems may transmit localisation packets in first timeslots and at least one of the each of the first and second groups of subsystems may transmit localisation packets in second timeslots that are interleaved with the first timeslots.

Some or all of the subsystems may be systems for localising and communicating with mobile tags as described above, may comprise any of the suitable optional features thereof, and may perform methods for localising and communicating with mobile tags described above including any optional features thereof.

Figure 1A:
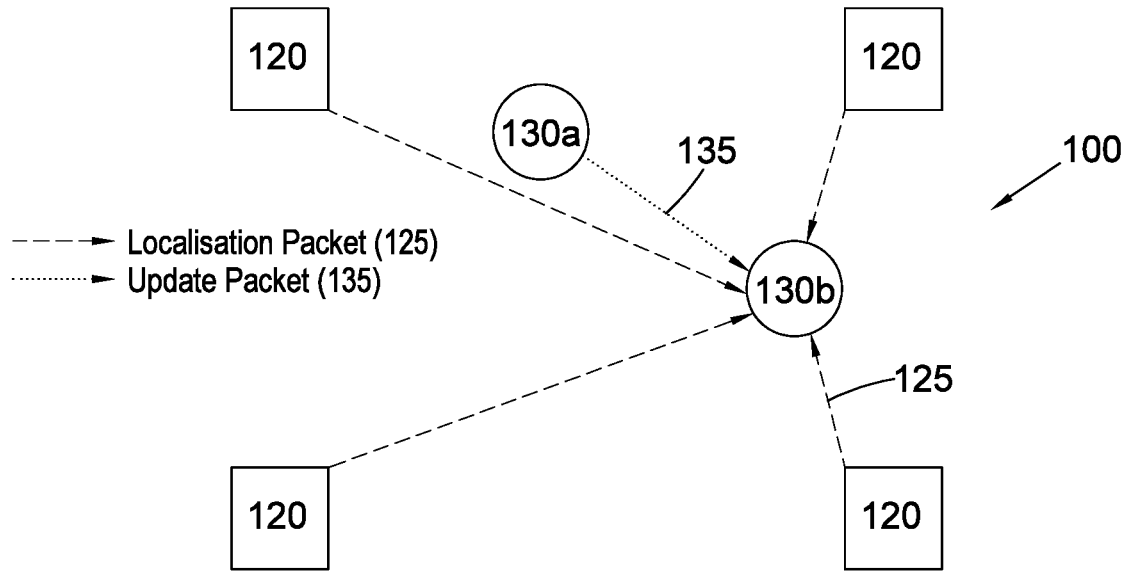
FIG. 1a shows a first system for localising and communicating with mobile tags communicating with two mobile tags.

FIG. 1a shows a first example of an embodiment of a system 100 for localising and communicating with mobile tags 130. Embodiments of methods for localising and communicating with mobile tags 130 may be performed using the system 100.

The system 100 comprises four anchors 120. It will be appreciated that the system can comprise fewer anchors 120 or additional anchors 120. In use, one or more mobile tags 130 may receive and measure the times of arrival of a plurality of payload-less localisation packets 125 transmitted by some or all of the anchors 120. These times of arrival (or differences between them) may be used to determine the one or more tags' locations using multilateration. Simultaneously another anchor 120, or another mobile tag 130 may transmit a payload-comprising update packet 135 thereby providing simultaneous communication using the system 100.

A total of three or more localisation packet 125 transmitting anchors 120 are required for the tag 130 to unambiguously determine its own location in all circumstances using multilateration if the tag is restricted to a two-dimensional plane. A total of four or more localisation packet 125 transmitting anchors 120 are required if the tag 130 is free to move in three dimensions. The system comprising a greater number of anchors 120 than these minimums can however allow said locations to be determined more reliably and/or accurately and/or may allow individual non-reference anchors 120 to transmit communication packets such as update packets 135 instead of localisation packets 125 in use.

The system 100 is illustrated localising and communicating with two mobile tags 130. However, it will be appreciated that the system may be configured to localise and communicate with a single such mobile tag 130, with three or more such mobile tags 130, and/or with any number of mobile tags 130.

The anchors 120 are in known locations. This allows a location of a mobile tag 130 to be determined using multilateration using distances between the tag 130 and a number of the anchors 120 (and/or differences between such distances). The anchors 120 are preferably fixed, preventing the anchors 120 from being displaced, which would require updating the known locations (for example, in the memory of the one or more mobile tags 130) to prevent inaccurate localisation of the tags 130. For example, the anchors 120 may be fixed to walls, ceilings, and/or furnishings. In alternative embodiments, the system 100 could be configured to update known locations of the anchors 120 in the memory of the tags 130 in the event that an anchor 120 is moved, for example, the system 100 may comprise a reference anchor 110 configured to transmit an initialisation packet 115 as shown in in FIG. 1b which may comprise a payload including updated anchor locations. The anchors 120 are preferably arranged where they will have relatively unobstructed lines of sight to an area covered by the system.

The one or more mobile tags 130 are movable with respect to the anchors 120 in use. One, some or all of the mobile tags 130 may be connectable to, connected to and/or comprised by, another device or object, such as a wearable device, a tool, a vehicle, a robot, an item of clothing, or packaging for one or more other objects. This may allow the location of such objects relative to the anchors to be tracked, for example, within a warehouse environment.

The anchors 120 and the one or more tags 130 are each, or each comprise, an ultra-wideband (UWB) transceiver such as a Decawave® DW1000 or DW1001 radio transceiver. Ultra-wideband is a radio technology in which information is transmitted across a wide bandwidth (such as more than 500 MHz or more than 20% of the arithmetic centre frequency).

Ultra-wideband signals comprise short duration pulses (which may have durations of 2 nanoseconds or less). This allows the times of arrival of ultra-wideband signals to be measured precisely with a high degree of resistance to multipath fading or interference effects; for example, using the channel impulse response (CIR) with which they are received. Low cost, small size ultra-wideband radios with low power requirements are available, which can be particularly advantageous for localisation anchors and tags. The UWB transceivers may transmit data according to the IEEE 802.15.4 standard.

Particularly advantageously, UWB transceivers can receive, and measure the times of arrival of, a plurality of UWB signals that are separated in time by significantly less than their durations, such as multipath components of single transmission, and/or multiple separate almost concurrent transmissions. For example, UWB transceivers can measure the times of arrival of a plurality of overlapping UWB signals of durations exceeding one hundred microseconds received only around one hundred nanoseconds apart.

While any payloads of such almost concurrent transmissions may not all be reliably decoded, their times of arrival can be determined from channel impulse response (CIR) with which they were received, which can be derived solely from their preambles. The preambles of UWB packets according to the IEEE 802.15.4 standard comprise repeated sequences of single pulses following patterns defined in the standard, whereas payloads of such packets comprise bursts of pulses. UWB transceivers are therefore able to determine the arrival times of signals whose payloads they do not successfully decode, or which do not comprise payloads.

For example, Decawave® DW1000 UWB radios measure the channel impulse response for approximately one thousand nanoseconds following their reception of a first signal. Such a channel impulse response will include peaks corresponding to each UWB subsequent signal received within this period, allowing each of their times of arrival to determined.

Therefore, in use, one or more mobile tag 130 UWB transceivers can each receive a plurality of almost-concurrent overlapping UWB signals transmitted at different times by different anchor's 120 UWB transceivers. Each of the different anchors 120 transmitting at a different time may allow the one or more mobile tags 130 to identify which localisation packet was transmitted by which anchor 120. The different anchors 120 being at known locations further allows the one or more mobile tags 130 to use the times of arrival (TOAs) or time difference of arrivals (TDOAs) of the localisation packets to determine their location using multilateration.

In some embodiments, one or more mobile tags 130 may be configured to be time synchronized with the plurality of anchors 120 and to know the transmission times of each of the plurality of localisation packets 125 (which may be pre-set times). Such mobile tags 130 may use the time of arrival (TOA) of each localisation packet 125 to calculate its times of flight (ToF), and by extension the distance to the known location of the identified anchor 120 that transmitted that localisation packet 125. Alternatively, or additionally one or more mobile tags may be configured to use the time difference of arrivals (TDOAs) between pairs of localisation packets 125 to calculate the differences between their times of flight, and by extension the difference in the distances to the known locations of the identified anchors 120 that transmitted those localisation packets 125. Either distances calculated using TOAs or differences in distances calculated using TDOAs can be used to determine the location of receiving mobile tags 130 using multilateration. Mobile tags that use TDOAs rather than TOAs advantageously do not need to be time synchronised with the plurality of anchors 120.

The anchors 120 and mobile tags 130 are configured to perform steps of localisation and communication operations. The arrows of FIG. 1a illustrate a overlapping packet transmissions 125, 135 between the anchors 110, 120 and two mobile tags 130a, 130b during a first example of such a localisation and communication operation according to an embodiment of a method described herein.

During localisation and communication operations, a plurality of the non-reference anchors 120 transmit nearly simultaneous localisation packets 125 without payloads while either a mobile tag or another of the non-reference anchors transmits a payload-carrying update packet 135 overlapping with the localisation packets 125 in time. This allows a listening transceiver (such as the reference anchor 110 or a mobile tag 130) to receive the content of the update packet 135 while also measuring the times of arrival of all of the overlapping packets 125, 135. This enables simultaneous localisation of listening mobile tags 130 and communication within the system 100.

The localisation and communication operation may be performed during a timeslot, such as a timeslot of a superframe comprising a plurality of timeslots, during some or all of which a single localisation and communication operation as described herein is performed.

In a localisation and communication operation, a plurality of the anchors 120 transmit localisation packets 125 without payloads and either an anchor 120 or a mobile tag 130 transmits an update packet 135 with a payload. Each of the localisation packets 125 is transmitted by a different anchor 120 at a different time corresponding to that anchor 120 and the localisation packets 125 overlap with each other and with the update packet 135 in time. Any of the anchors 120 and/or one or more mobile tags 130 that do not transmit a localisation packet 125 or the update packet 135 preferably listen to receive the overlapping localisation packets 125 and the update packet 135.

In the localisation and communication operation illustrated in FIG. 1a, each of the four non-reference anchors 120 transmits a localisation packet 125 without a payload at a time corresponding to that anchor 120 and one of the mobile tags 130a transmits an update packet 135 with a payload at a update time. The four times corresponding to the anchors 120 and the update time are closely spaced such that the four localisation packets 125 and the update packet 135 overlap in time. The other mobile tag 130 blistens for and receives the overlapping localisation packets 125 and update packet 135.

The listening mobile tag 130b measures the times of arrival of the plurality of localisation packets 125, and uses the different times at which each anchor 120 transmitted a localisation packet 125, to identify which anchor 120 transmitted which localisation packet 125 (for example, using the order or time windows in which the localisation packets 125 were received). The listening mobile tag 130b uses these times of arrival or differences between them to determine its location using multilateration as described above. The update packet 135 transmitted by the other mobile tag 130a contains a payload specifying a position of that mobile tag 130a determined in previous localisation and communication operation, and thereby communicates this location to the listening mobile tag 130b.

It will be appreciated that in other localisation and communication operations, such as operations performed in different timeslots, the system shown if FIG. 1a could operate differently. For example, one of the anchors 120 could transmit an update packet 135 instead of a localisation packet, and both both toe the mobile tags 130a, 130b could listen to receive the three localisation packets 125 and the update packet 135 transmitted by the anchors 120.

Figure 1B:
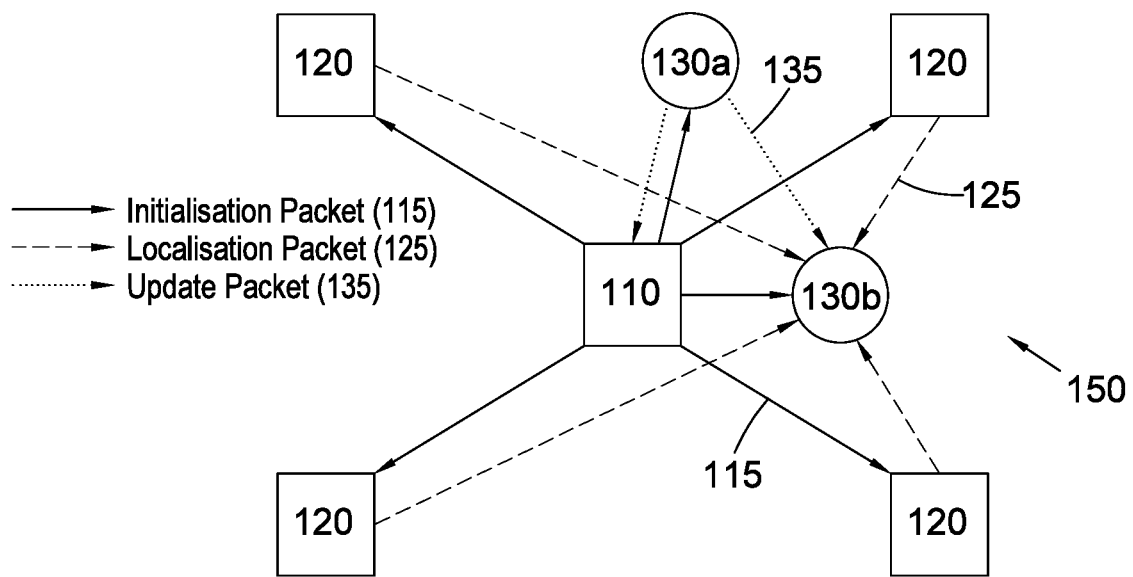
FIG. 1b shows a second system for localising and communicating with mobile tags communicating with two mobile tags.

FIG. 1b shows a second example of an embodiment of a system 150 for localising and communicating with mobile tags 130, with which embodiments of methods for localising and communicating with mobile tags 130 may be performed.

The system 150 shown in FIG. 1b differs from the system shown in FIG. 1a in that it further comprises a reference anchor 110. The reference anchor 110 is used to transmit an initialisation packet 115, which initialises a localisation and communication operation as described above. The initialisation packet may also be used to carry information (such as most recent known locations of mobile tags 130) and to synchronize or provide a common time reference for each of the non-reference anchors 120 (and optionally one or more mobile tags 130).

The reference anchor 110 also comprises an UWB transceiver. The reference anchor 110 may comprise any of the suitable optional or preferred features of the non-reference anchors 120 described above with reference to FIG. 1a. For example, the reference anchor may be at a known location or its UWB transceiver being a Decawave® DW1000 or DW1001 single chip radio transceiver.

The reference anchor 110 is preferably arranged with an unobstructed line of sight to each of the other anchors 120, allowing it to reliably transmit an initialisation packet to each of the other anchors 120.

The system 150 is shown performing a communication and localisation operation. The arrows of FIG. 1b illustrate a series of packet transmissions 115, 125, 135 between the anchors 110, 120 and two mobile tags 130a, 130b during a second example of such a localisation and communication operation according to an embodiment of a method described herein.

In an initial step of some embodiments of localisation and communication operations, a reference anchor 110 transmits an initialisation packet 115 that is received by some or all of a plurality of non-reference anchors 120, and optionally one or more mobile tags 130, that listen to receive the initialisation packet 115.

In the localisation and communication operation illustrated in FIG. 1, all of the four non-reference anchors 120 and two mobile tags 130a, 130b listen for and receive an initialisation packet 115 transmitted by the reference anchor 110.

After the transmission of the initialisation packet 115, the plurality of non-reference anchors 120 that received the initialisation packet 115 transmit localisation packets 125 and either a non-reference anchor 120 or a mobile tag 130 that received the initialisation packet 115 transmits an update packet 135, as described above with reference to FIG. 1a. In the operation shown in FIG. 1b the times at which localisation packets are transmitted may be pre-set delay times after the transmission time of the initialisation packet, and the update time may be a pre-set time after the transmission time of the initialisation packet.

In the operation shown in FIG. 1b the reference anchor 110 listens for and receives the overlapping localisation packets 125 and update packet 135. The previously determined location of mobile tag 13a specified in the update packet 135 is therefore communicated to the reference anchor 110.

Systems 100, 150 as described above may cover a limited area, such as an area limited by the range of the anchors 110, 120. In order to cover larger areas, an arrangement comprising a plurality of systems 100 as described above may be used.

Such multiple systems 100 (and/or the reference anchors 110 thereof) may communicate with each other to share data (such as determined tag locations) and/or for time synchronization. One or more mobile tags 130 may be configured to be localised by, and communicate with, any of the plurality of systems 100. Different systems 100 may perform localisation and communication operations using different channels and/or in different timeslots. Such embodiments are described in more detail later in the description with reference to FIGS. 8 and 9.

Figure 2:
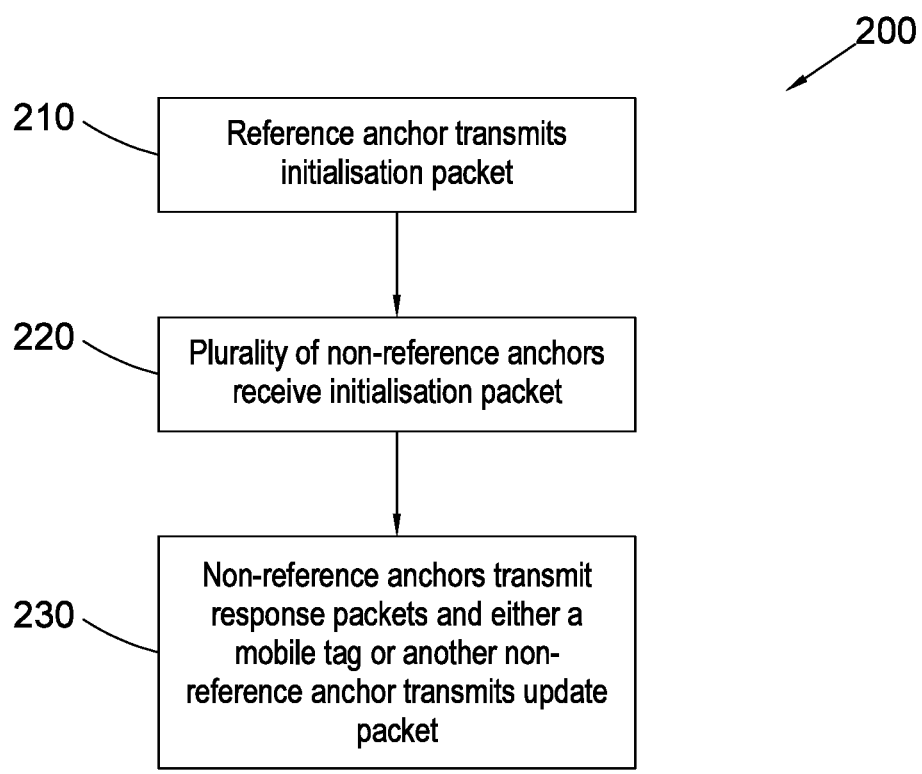
FIG. 2 is a flow chart of a localisation and communication method.

FIG. 2 is a flow chart of an embodiment of a localisation and communication method 200 performed by a system comprising a reference anchor 110 and a plurality of non-reference anchors 120, such as a system 150 as described above with reference to FIG. 1b.

An iteration of the method 200 may be performed during a timeslot, such as a timeslot of a superframe comprising a plurality of timeslots. In some embodiments, iterations of method 200 as described herein may be repeated in each of a plurality of sequential timeslots, or in each of series of timeslots assigned to the method and/or the system 150 performing the method. It will be appreciated that a method 200 as described herein may be performed in some of a series of timeslots, with methods omitting some of the steps of the method (such as the transmission of an update packet 135) being performed in other timeslots of the series.

In a first step 210 of the method 200, a reference anchor 110 transmits an initialisation packet 115.

The initialisation packet 115 is preferably used to trigger subsequent steps of the method 200 performed by some or all of a plurality of non-reference anchors 120 and/or one or more mobile tags 130 that receive it, and to define a common time frame with reference to which subsequent transmissions 125, 135 are performed.

In some embodiments, the initialisation packet 115 may be used to transmit data from the reference anchor 110 to non-reference anchors 120 and/or mobile tags 130. The initialisation packet 115 may comprise a payload including data to be communicated to the non-reference anchors 120 and/or to the one or more mobile tags 130 that listen for and/or receive it.

For example, the payload may include the most recent positions of each of one or more mobile tags 130 known to the reference anchor 110, which may be communicated to these mobile tags 130 using the initialisation packet 115. This information may inform a mobile tag 130 of the position of other mobile tags, for example, in order to prevent collisions, and/or may inform a mobile tag 130 of its position known to the reference anchor 110, allowing it to determine whether to broadcast a position update after determining its position using multilateration. Alternatively, or additionally, the payload data can include the identities and/or locations of some or all of the anchors 110, 120 of a system with which the method 200 is performed, and/or the times at which they are configured to transmit localisation packets 125 during the third step 230 of the method 200. In some embodiments, the payload data can include information on the timing of initialisation packets 115, such as the separation between such initialisation packets 115 and/or the duration of a timeslot.

All of the non-reference anchors 120 and any mobile tags 130 may be configured to listen to receive the initialisation packet at the time at which it is transmitted.

In a second step 220 of the method 200 a plurality of non-reference anchors 120, and optionally one or more mobile tags 130, receive the initialisation packet 115.

Each of the non-reference anchors 120 is at a known location and has a corresponding pre-set delay time, which may be a pre-set delay time after the transmission time of the initialisation packet 115.

The non-reference anchors 120 and/or the mobile tags 130 that receive the initialisation packet 115 may be all or a subset of the non-reference anchors 120 and/or the mobile tags 130 that listen for the initialisation packet 115 while it is transmitted. This may be all or some of the non-reference anchors 120 and/or the mobile tags 130 comprised by a system 150 with which the method 200 is performed. Any non-reference anchors 120 that do not receive the initialisation packet preferably also are at known locations and may also each have a corresponding pre-set delay time.

The initialisation packet triggers the transmission of a plurality of closely time-separated localisation packets 125 by at least some of the non-reference anchors 120 that receive it. The times of arrival of these localisation packets 125 may be used by one or more mobile tags 130 to identify the anchors 120 that transmitted those localisation packets 125 and to determine their locations using multilateration. In order for mobile tags 130 to reliably use the times of arrival as described above, it is necessary for said localisation packets 125 to have been transmitted at known and/or pre-set times relative to each other (to allow differences in their times of flight to be calculated from their TDOAs) and/or at times known to synchronized mobile tags (to allow their absolute time of flight to be calculated from their TOAs). The plurality of anchors are therefore preferably synchronized with each other (for example, using an initialisation packet as described above), and may be synchronized with one or more mobile tags Each of the non-reference anchors 120 and/or mobile tags 130 that receives the initialisation packet 115 may estimate the transmission time of the initialisation packet 115. Each of these non-reference anchors 120 is at a known location relative the reference anchor 110, and therefore has a known time of flight for a direct signal from the reference anchor 110 (which will be the first multipath component of such a signal). Such a non-reference anchor 120 may therefore estimate the transmission time of the initialisation packet 115 from the time at which it receives the initialisation packet and this known time of flight. The pre-set delay time at which a non-reference anchor 120 transmits a localisation packet 125 may be a time relative to time of transmission of the initialisation packet as estimated by that non-reference anchor 120. Similarly, one or more mobile tags 130 may estimate the time of transmission of the initialisation packet 115 from the time at which they receive it and an estimated time of flight to the reference anchor, which may be based on a location of that tag as determined in a previous iteration of the method and/or previous timeslot.

Preferably, all of the non-reference anchors 120 comprised by the system 150 are arranged at locations where they can reliably receive transmissions of the reference anchor 110 (for example, with unobstructed lines of sight to the reference anchor 110).

In some embodiments, the initialisation packet 115 may be used to synchronize the clocks of the non-reference anchors 120 and/or mobile tags 130 that receive the initialisation packet 115 with the clock of the reference anchor 110. The initialisation packet 115 may be transmitted at a fixed time in the timeslot during which the localisation and communication operation is performed, such as at the start of the timeslot. Alternatively, the initialisation packet may not be transmitted at a fixed time, but may have its transmission time encoded therein. This may allow the initialisation packet 115 receiving non-reference anchors 120 and/or mobile tags 130 to synchronize their clocks with the clock of the reference anchor 110. For example, they may adjust their clocks such that an estimated transmission time of the initialisation packet (which may be determined as described above) is equal to fixed or encoded transmission time of the initialisation packet.

In some embodiments, the anchors, which are at known locations, may be relatively tightly synchronised with the reference anchor using known time-of-flight times of the initialisation packet from the reference anchor to their known locations. One or more mobile tags that receive the initialisation packet may be relatively less tightly synchronized with the reference anchor as they are not at fixed locations and do not have pre-defined times of flight to the reference anchor. Such a relatively less tight synchronization may enable the one or more mobile tags to perform one or more steps of the method (such as listening for, receiving, and/or transmitting packets) at appropriate times. However, it may not be sufficiently tight for mobile tags to precisely determine their distance to an anchor from the time of arrival of a localisation packet received from such an anchor as they will not precisely know the localisation packet's transmission time. Therefore, the one or more mobile tags that are relatively less tightly synchronized to the reference anchor may use the time differences of arrival of multiple localisation packets for multilateration, rather than their absolute times of arrival, as this only requires the differences between the localisation packets transmission times to be known precisely for precise localisation. Such differences may be known to the one or more mobile tags because the anchors that transmit the localisation packets may be tightly synchronised with each other, by virtue of having received the initialisation packet.

In the IEEE 802.15.4 ultra-wideband physical layer standard for message time stamping, the transmission time of an ultra-wideband packet is defined as the transmission time of the first symbol of the physical layer header (PHR). The physical layer header follows the preamble and the single frame delimiter (SFD) and precedes any payload of the packet.

It will be appreciated that in alternative communication and localisation methods, such as methods performed using the system 100 shown in FIG. 1a, the first and second steps 210, 220 described above may be omitted. In such embodiments, different means and/or techniques for synchronizing or providing a common time reference for the non-reference anchors 120 (and optionally mobile tags 130) may be used. For example, using a backend system which may be connected to each of the non-reference anchors 120 using wired connections and may provide synchronization between them. In such embodiments, the pre-set delay times at which the localisation packets 125 are transmitted may not be delay times after the initialisation packet 115.

In a third step 230 of the method 200, a plurality of localisation packets 125 are transmitted with a plurality of the non-reference anchors 120 and an update packet 135 is transmitted with either a mobile tag 130 or another of the plurality of non-reference anchors 120.

The update packet 135 comprises a payload and the localisation packets 125 comprise no payload. Each of the plurality of localisation packets 125 is transmitted by a different non-reference anchor 120 at a pre-set delay time (such as a time after the transmission time of the initialisation packet) corresponding to that non-reference anchor 120. The localisation packets 125 overlap with each other and with the update packet 135 in time.

The plurality of localisation packets 125 may be used by one or more listening mobile tags 130 to determine their locations. The localisation packets 125 overlapping in time allows such a listening mobile tag 130 to measure all of their times of arrival. The localisation packets 125 being transmitted at different times corresponding to their different transmitting non-reference anchors 120 allows such a receiving mobile tag 130 to identify their transmitting anchors 120 from the order and/or time windows in which said they are received. This allows such a mobile tag 130 to calculate distances to the known locations of the non-reference anchors (and/or differences between these distances) and to determine its location using multilateration.

The payload of the update packet 135 may contain data to be communicated to mobile tags 130 and/or to the reference anchor 110. In some embodiments, the payload may include the location of a mobile tag 130, such as a location determined in a previous iteration of the method 200 and/or a previous timeslot.

The update packet 135 comprising a payload and the overlapping localisation packets 125 comprising no payload advantageously reduces interference from the localisation packets 125 with the payload of the overlapping update packet 135, advantageously allowing the update packet to be more reliably received.

In some embodiments, the update packet 135 may only be transmitted if a mobile tag 130 or non-reference anchor 120 has information to be communicated to another listening element of the system (such as the reference anchor 110 or a non-transmitting mobile tag 130). For example, a mobile tag 130 or non-reference anchor 120 may transmit an update packet 135 if it is aware of position update of a mobile tag 130 that was determined in a previous timeslot and that was not reflected in payload of the initialisation packet 110 that specified positions of mobile tags 130 known to the reference anchor.

Each of the plurality of non-reference anchors 120 that received the initialisation packet 115 (and preferably each non-reference anchor 120 of the system 150 with which the method 200 is performed) corresponds to a different pre-set delay time. Therefore, each of the localisation packets 125 transmitted during the third step is transmitted at a different pre-set time corresponding to the non-reference anchor 120 by which it was transmitted. This advantageously enables one or more mobile tags 130 receiving the localisation packets 125 to determine the transmitter of each packet 125, 135 from the order and/or time windows in which said localisation packets 125 were received.

The times of arrival of the localisation packets 125 can be determined from the channel impulse response (CIR) with which they are received, which can be derived solely from the preambles of the localisation packets 125 without requiring payloads to be present.

Preferably, the update packet 135 is transmitted at a different time to any of the localisation packets 125. This may advantageously allow a mobile tag 130 receiving localisation packets 125 and the update packet 135, to distinguish the update packet 135 from the localisation packets using their times of arrival and to selectively use the times of arrival of the localisation packets 125 to determine its location as described above.

The update packet 135 is preferably transmitted after the overlapping plurality of localisation packets 125. This may advantageously ensure that the localisation packets 125 (which do not include payloads) only overlap with the preamble or header portions of the update packet 135 and not its payload. This may advantageously prevent the payload of the update packet 135 interfering with any of the localisation packets 125 and may increase the likelihood that it is successfully received, and may facilitate reliable identification of the transmitters of the localisation packets 125 from their times of arrival. In alternative embodiments, the update packet 135 may be transmitted between two of the localisation packets 125.

In some embodiments, the update packet 135 is transmitted at a pre-set update time (such as a pre-set time after the transmission time of the initialisation packet 115) that is preferably different from the plurality of pre-set delay times and/or is after the plurality of pre-set delay times.

Each non-reference anchor 120 or mobile tag 130 that transmits a localisation or update packet 125, 135 at a pre-set delay time after the transmission time of the initialisation packet 115 may do so at such a pre-set time after the time that it estimates the initialisation packet 115 was transmitted. Such an estimate of the transmission time of the initialisation packet 115 may be made using a receipt time of the packet 115 and a time of flight derived from a known location of the transmitting anchor 120 or tag 130.

In order to allow receiving mobile tags 130 to identify more reliably which non-reference anchor 120 transmitted each localisation packet 125, the pre-set delay times are preferably separated by enough time to prevent any localisation packet 125 being received by a mobile tag 130 after or at substantially the same time a subsequently transmitted localisation packet 125. If the separation between two of the pre-set delay times is too short a mobile tag 130 may receive a later transmitted localisation packet 125 from a closer anchor 120 before or at substantially the same time as an earlier transmitted localisation packet 125 from a more distant anchor 120. This would result in the peaks corresponding to the localisation packets 125 (or multipath components thereof) in the Channel impulse response of the mobile tag 130 overlapping or being in a different order to the order in which the packets 125 were transmitted. Preferably, a pre-set update time is also separated from any of the delay times by such a time.

The separations between consecutive pre-set delay times (and preferably between a pre-set update time and any of the pre-set delay times) may therefore be longer than a maximum expected time-of-flight of a localisation packet to a mobile tag (optionally plus an expected delay spread of a localisation packet received by a mobile tag), such as to a mobile tag at any location within an area covered by the system. For example, the separation between each pair of consecutive pre-set times may be greater than the distance between the anchors corresponding or assigned to said pair of pre-set times divided by the speed of light (optionally plus an expected delay spread of a localisation packet received by a mobile tag). In other some embodiments, the separation between consecutive pre-set times may be equal to, longer than, or at least double, a minimum, average or maximum distance between any pair of non-reference anchors 120 divided by the speed of light (optionally plus an expected delay spread of a localisation packet received by a mobile tag).

In some embodiments, the separation between each pair of consecutive pre-set delay times (or of each pair of consecutive pre-set times including the delay times and an update time) may be equal. This may advantageously avoid any particularly close pre-set times that might result in hard to distinguish times of arrival.

In some embodiments, the difference between the earliest and latest pre-set delay times (or between the earliest and latest of the pre-set times comprising the delay times and an update time) may be less than duration of a period for which a mobile tag 130 measures its channel impulse response (CIR), preferably minus a maximum expected localisation packet time-of-flight (and optionally an expected delay spread of a localisation packet received by a mobile tag). This may advantageously ensure that even with a maximum shift in the times of arrival, the times of arrival of all of the packets 125, 135 transmitted in the third step 230 can be measured in a single receipt operation.

For example, in a system that uses Decawave® DW1000 UWB radios that record CIR for 992 or 1016 samples with 1.0016 nanosecond durations (i.e. for 993.6 or 1017.4 nanoseconds) and has maximum expected localisation packet time of flight of 128 nanoseconds (equivalent to a distance of 38.4 meters), the difference between the earliest and latest pre-set time may be less than 865.6 nanoseconds. For example, six pre-set delay times corresponding to six different non-reference anchors 120 may be separated by the expected delay spread of 128 nanoseconds, and followed by a pre-set update time 128 nanoseconds after the last pre-set delay times, such that the difference between the earliest and latest pre-set times is 768 nanoseconds.

The separation between consecutive pre-set times may be of the order of hundreds of nanoseconds. In some embodiments, the separation between consecutive pre-set times may be greater than 50 nanoseconds, greater than 100 nanoseconds, less than 250 nanoseconds, less than 200 nanoseconds, and/or less than 150 nanoseconds. For example, the separations may be 128 nanoseconds. In some embodiments, the separation between consecutive pre-set times (and/or between the earlies and latest pre-set delay times) may be less than the duration of a symbol of the UWB packets. For example a single symbol in UWB packets transmitted between Decawave® UWB radios has a duration of 1000 nanoseconds, and the separation between consecutive pre-set times may be less than 1000 nanoseconds.

The duration of an ultra-wideband packet without a payload is typically between 100 μs and 1200 μs (depending upon the length of the preamble and the data rate with which the packet is transmitted). This is significantly longer that the separations between pre-set times described above, and is significantly longer that the duration for which UWB transceivers typically measure their channel impulse response. Therefore, the plurality of localisation packets 125, while transmitted at pre-set times separated by the nanosecond-duration times described above, overlap. This allows the packets 125, 135 transmitted during the third step 230 to be received in a short period by the reference anchor 110 and/or one or more mobile tag 130.

The transmission timing precision of a DW1000 UWB transceiver is 8 ns, which allows the closely spaced localisation packets 125 to be transmitted, while introducing some uncertainty into their times of arrival at the mobile tag 130.

The earliest pre-set delay time is preferably late enough for the initialisation packet 115 and the payload thereof to be received by the non-reference anchors 120 (and preferably by one or more mobile tags 130), and for the non-reference anchors' transceivers to switch from receive to transmit mode. This delay time may be longer than the duration of the initialisation packet (which includes a payload and therefore typically will have a duration exceeding 150 µs), plus a maximum time-of-flight from the reference anchor 110 to the non-reference anchors 120, plus a required time for the reference anchors' transceivers to switch from receive to transmit mode. For example, the predetermined delay may be 178.5 µs or 330 µs. Preferably, this earliest pre-set delay time is relatively small (for example, less than 500 µs) so as to minimise clock drift between components of the system.

In some embodiments, each of the non-reference anchors 120 that received the initialisation packet 115 may transmit localisation packet 125 (in which case a mobile tag 130 transmits the update packet 135). In alternative embodiments, one or more of the non-reference anchors 120 that received the initialisation packet 115 may be triggered to not transmit a localisation packet by the content of the payload of the initialisation packet 115. For example, if a non-reference anchor 120 receives an initialisation packet 115 with payload data that does not reflect a position update 135 that was broadcast by a mobile tag 130 and received by said non-reference anchor 120 during an immediately preceding timeslot, it may be scheduled to broadcast said position update instead of transmitting a localisation packet 125. Such an embodiment will be described in more detail with reference to FIG. 6 later in the description.

During the third step 230 of the method 200, the reference anchor and optionally one or more mobile tags 130 listen to receive the localisation packets 125 and the update packet 135.

In some embodiments, one or more mobile tags (such as the mobile tags that received the initialisation packet 125 in the second step 220 of the method 200) listen to receive the localisation packets 125 and the update packet 135 in the third step 230. Such one or more mobile tags 130 may receive and measure the times of arrival of some or all of the localisation packets 125 (and optionally the update packet 135) and may identify the non-reference anchor 120 that transmitted each received localisation packet 125 from the order and/or time windows in which they are received. Such a mobile tag 130 may then use the times of arrival of the received localisation packets 125 (or the differences between them) to determine its location using multilateration.

For example, one or more mobile tags 130 may identify each peak in the channel impulse response with which it received the localisation packets 125 (and optionally the update packet 135) that exceeds a noise threshold. Such a mobile tag 130 may then determine in which of a plurality of time windows between pre-set times following the transmission of the initialisation packet, with a peak in a given one of the time windows indicating a packet transmitted at the pre-set time at the beginning of that time window. The mobile tag 130 may then determine the time after the pre-set time at the beginning of that time window at which the peak is located (i.e. how far into the time window the peak is located), with this being the time-of-flight of that packet, which may be used to determine the distance to its transmitter. If multiple peaks above a noise threshold exist in such a time window, the mobile tag 130 may measure the time-of flight of the earliest or highest peak in such a time window, the other peaks may be disregarded as multipath components.

Alternatively, or additionally, to using the differences between the transmission time of the initialisation packet and the receipt times of localisation packets 125 to determine the distances to the anchors 120 that transmitted those localisation packets 125, a mobile tag may use differences between the separations of times of arrival of pairs of the localisation packets 125 and the separations of the pre-set transmission times of said pairs of localisation packets 125 to determine the difference between that tags' distances to the two non-reference anchors 120 that transmitted those localisation packets. Such a method may be more accurate if the mobile tag 130 inaccurately estimates the transmission time of the initialisation packet 110 or is otherwise not accurately synchronized with the anchors 120.

In some embodiments, the method may comprise a fourth step in which one or more mobile tags that determined their locations using multilateration as described above (or which received an initialisation packet 110 that does not reflect positions that they most recently transmitted) each transmit a position-specifying packet. Such mobile tags may transmit such a position-specifying packet 135 during the iteration of the method and/or timeslot in which they determined their location (which may reduce latency) or in a random subsequent iteration of the method and/or timeslot (which may avoid interference if multiple tags determine new locations simultaneously). Preferably, such mobile tags only transmit such a position-specifying packet if their determined position is different to their position known to the reference anchor 110 specified in the initialisation packet 115. Such a position-specifying packet is transmitted after the transmission and receipt of the localisation packets 125 and the update packet 135. The reference anchor 110, and preferably each of the non-reference anchors 120 may listen to receive the position-specifying packet. The non-reference anchors 120 listening to receive the position-specifying packet may allow them to retransmit the location in update packets 135 in subsequent iterations of the method in the event that the reference anchor 110 does not successfully receive the position-specifying packet.

Alternatively, or additionally, one or more mobile tags that determined their locations using multilateration as described above (or which receives an initialisation packet 110 that does not reflect a position that it most recently transmitted) may each transmit an update packet 135 containing its identified location in a payload in a subsequent iteration of the method 200 and/or timeslot. Such mobile tags may transmit an update packet 135 specifying their determined position in an immediately subsequent iteration of the method 200 and/or timeslot (which may reduce latency) or in a random subsequent iteration of the method 200 and/or timeslot (which may avoid interference if multiple tags determine new locations simultaneously). Preferably, such mobile tags only transmit such an update packet if their determined position is different to their position known to the reference anchor specified in the initialisation packet.

The steps of listening to receive the plurality of localisation packets 125 and using them for localisation (and optionally transmitting a position-specifying packet) may be performed by a mobile tag 130 in timeslots in which a method 200 as described herein is performed (for example, in which an update packet 135 is not transmitted). In such timeslots, the one or more mobile tags may still perform steps as described herein which trigger the performance of actions in subsequent timeslots in which a method 200 as described herein is performed.

If multiple mobile tags 130 transmit update packets 135 or transmit position specifying packets as described above in the same iteration of the method 200 and/or the same timeslot, their payloads will not both be successfully received by the reference anchor 110. For example, the multiple packets may interfere resulting in the received payload being corrupted. Techniques for ensuring the position updates are communicated to the reference anchor 110 are described below.

In some embodiments, multiple mobile tags may be able to transmit update packets 135 or position specifying packets as described above in the same iteration of the method 200 and/or timeslot, which as described above may result in their position updates not be communicated to the reference anchor 110. In such embodiments, one or more mobile tags may be configured to determine whether their position that they have transmitted (in either an update packet 135 or a position-specifying packet) is reflected in a subsequently received initialisation packet 110. If such mobile tags determine that their transmitted position is not reflected in such a subsequently received initialisation packet 110, they may wait a random number of timeslots (a random back off period) before retransmitting their position update in a new update packet 135 or position-specifying packet of a subsequent timeslot. If such a tag determines a further new position during the back off period, they may wait until the end of the back off period and transmit this new position in the new update packet 135 or position-specifying packet of a subsequent timeslot, or the back off period may be cancelled.

In some such embodiments, one, some, or all of the non-reference anchors 120 may be configured to listen for and receive position-specifying packets transmitted by mobile tags 130 in an optional fourth step as described above. Non-reference anchors that receive such position-specifying packets may determine whether one or more position updates they have received in such position-specifying packets are reflected in a subsequent initialisation packet 110 they receive from the reference anchor 110 (preferably an immediately subsequent initialisation packet transmitted in the next iteration of the method 200 and/or timeslot). If such one or more position updates they have received is not reflected in such a subsequent initialisation packet 115, they may transmit an update packet 135 whose payload includes said one or more position updates in the iteration of the method 200 and/or timeslot in which they received that initialisation packet 115. In such embodiments, if a non-reference anchor 120 successfully transmits an update packet to the reference anchor 110 in this manner and a subsequent initialisation packet 115 reflecting the one or more position updates is received by the one or more mobile tags 130 whose positions were updated, such mobile tags may cancel a back off period that they have entered.

In some embodiments, each of a plurality of mobile tags 130 may be assigned to different timeslots of a sequence of timeslots, and may be configured to only transmit update packets 135 and/or position-specifying packets during those timeslots. In some such embodiments, each of the plurality of mobile tags may be assigned to different timeslots. After determining a change in their position using localisation in a first timeslot, such a mobile tag 130 may transmit their position update in the next timeslot to which it is assigned. This may advantageously prevent simultaneous transmissions of different mobile tags 130 interfering and preventing communication of position updates.

It will be appreciated that if no mobile tag is present to receive the localisation packets 125 (for example if no mobile tag 130 is present in the area covered by the system 150 and/or within range of the non-reference anchors 120 when the method is performed), steps performed by mobile tags 130 may be omitted.

In order for a mobile tag 130 to accurately determine its location as described above, the plurality of localisation packets 125 must be transmitted at fixed times relative to each other known to listening mobile tags 130. The plurality of non-reference anchors 120 (and optionally one more mobile tags 130) are therefore preferably time synchronised. In the example method 200 described above, a reference anchor 110 is used to transmit an initialisation packet 115 that is used to synchronize and/or provide a common time reference for the non-reference anchors 120 and to initialise a localisation and communication operation. It will be appreciated that in alternative embodiments, one or more different means may be used to synchronize and/or provide a common time reference for the non-reference anchors 120 and mobile tags 130 and/or to initialise a localisation and communication operation. In such alternative embodiments, the reference anchor 110, the initialisation packet 115 and the first and second steps 210, 220 may be omitted or replaced.

Figure 3:
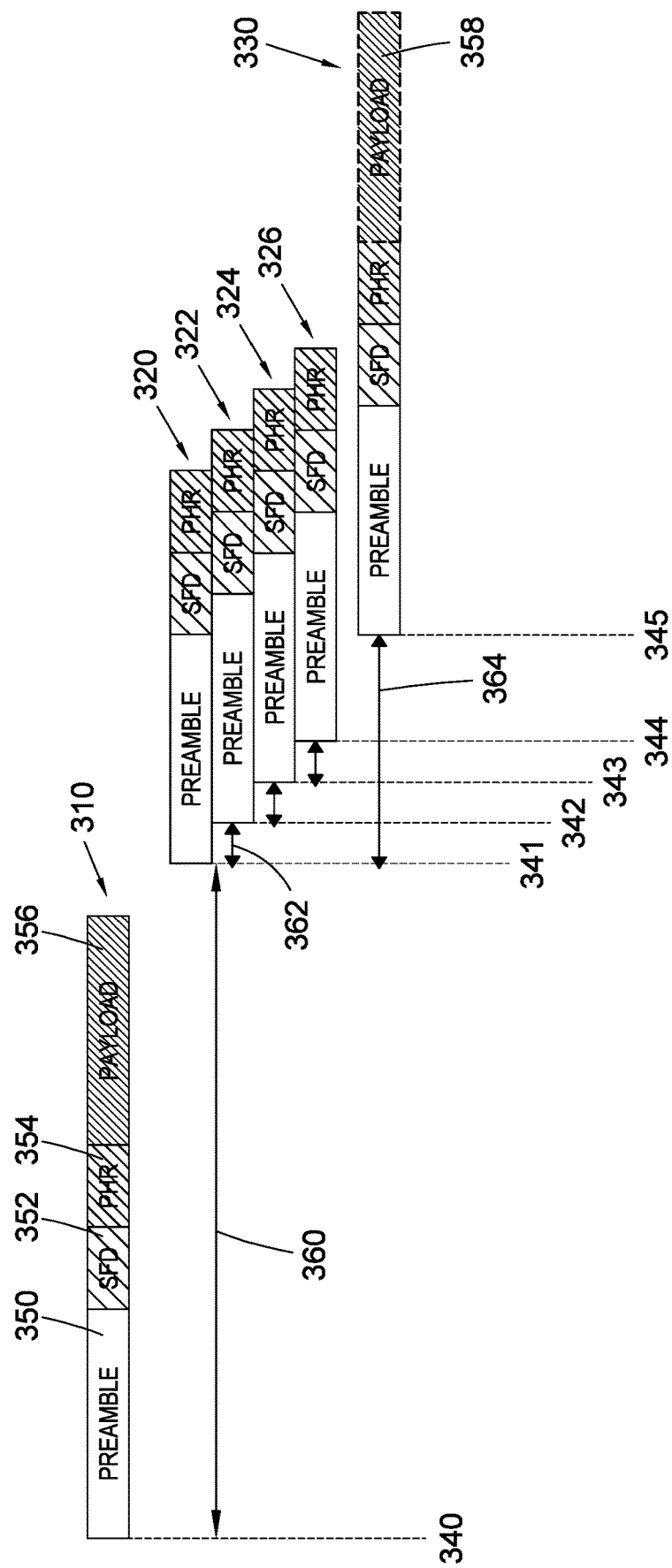
FIG. 3 shows the structure and relative timings of a packets transmitted during a timeslot in which a localisation and communication method is performed.

FIG. 3 shows the structure and relative timings of packets 310, 320, 322, 324, 326, 330 transmitted in timeslot 300 of an example of a method as described above with reference to FIG. 2.

At the start 340 of the timeslot 300, an initialisation packet 310 is transmitted by a reference anchor. The initialisation packet 310 comprises a preamble 350, a single frame delimiter (SFD) 352, a physical layer header (PHR) 354, and an initialisation payload 356 that contains the most recent locations of one or more mobile tags known to the reference anchor.

The initialisation packet 310 is transmitted by the reference anchor and is listened for and received by four non-reference anchors that are not scheduled to transmit an update packet 330, and by one mobile tag or non-reference anchor that is scheduled to transmit an update packet 330.

Each of the four non-reference anchors that are not scheduled to transmit an update packet 330 are associated with a different pre-set delay time 341, 342, 343, 344 after the start 340 of the timeslot 300. The first pre-set delay time is at a constant delay 360 after the start 340 of the timeslot 300 longer that the duration of the initialisation packet 310, plus a time of flight between reference anchor and the non-reference anchors, and a time required switch a non-reference anchor from a receiving mode to a transmitting mode. The four pre-set delay times 341, 342, 343, 344 are separated from each other by equal time offsets 362 greater than a maximum expected localisation packet time of flight.

Each of the non-reference anchors that received the initialisation packet and are not scheduled to transmit an update packet 330 transmits a localisation packet 320, 322, 324, 326, at the pre-set delay time 341, 342, 343, 344 with which they are associated. Each of the localisation packets 320, 322, 324, 326 comprises a preamble 350, a single frame delimiter (SFD) 352, a physical layer header (PHR) 354, and no payload.

The equal time offsets 362 between the pre-set delay times 341, 342, 343, 344 are significantly shorter than duration of the localisation packets 320, 322, 324, 326 such that the four localisation packets 320, 322, 324, 326 overlap in time.

At a pre-set update time 345 after the start 340 of the timeslot 300, an update packet 330 is transmitted by either a mobile tag that received the initialisation packet 310, or a non-reference anchor that received the initialisation packet 310 and does not transmit a localisation packet 320, 322, 324, 326. The pre-set update time 345 is after the final pre-set delay time 344 but is separated from the earliest pre-set delay time 341 by a period 364 less than the duration of any of the localisation packets 320, 322, 324, 326. The update packet 330 therefore overlaps with each of the localisation packets 320, 322, 324, 326.

The update packet 330 comprises a preamble 350, a single frame delimiter (SFD) 352, a physical layer header (PHR) 354, and an update payload 358 that includes an updated location of a mobile tag that was determined in a previous timeslot.

The separation 364 between the first pre-set delay time 341 and the final pre-set delay time 344 plus a maximum expected localisation packet time of flight is less than the duration for which a mobile tag measures its channel impulse response in a single receipt operation. Therefore a mobile tag receiving the localisation packets 320, 322, 324, 326 will be able to measure all of their times of arrival from its channel impulse response.

Figure 4:
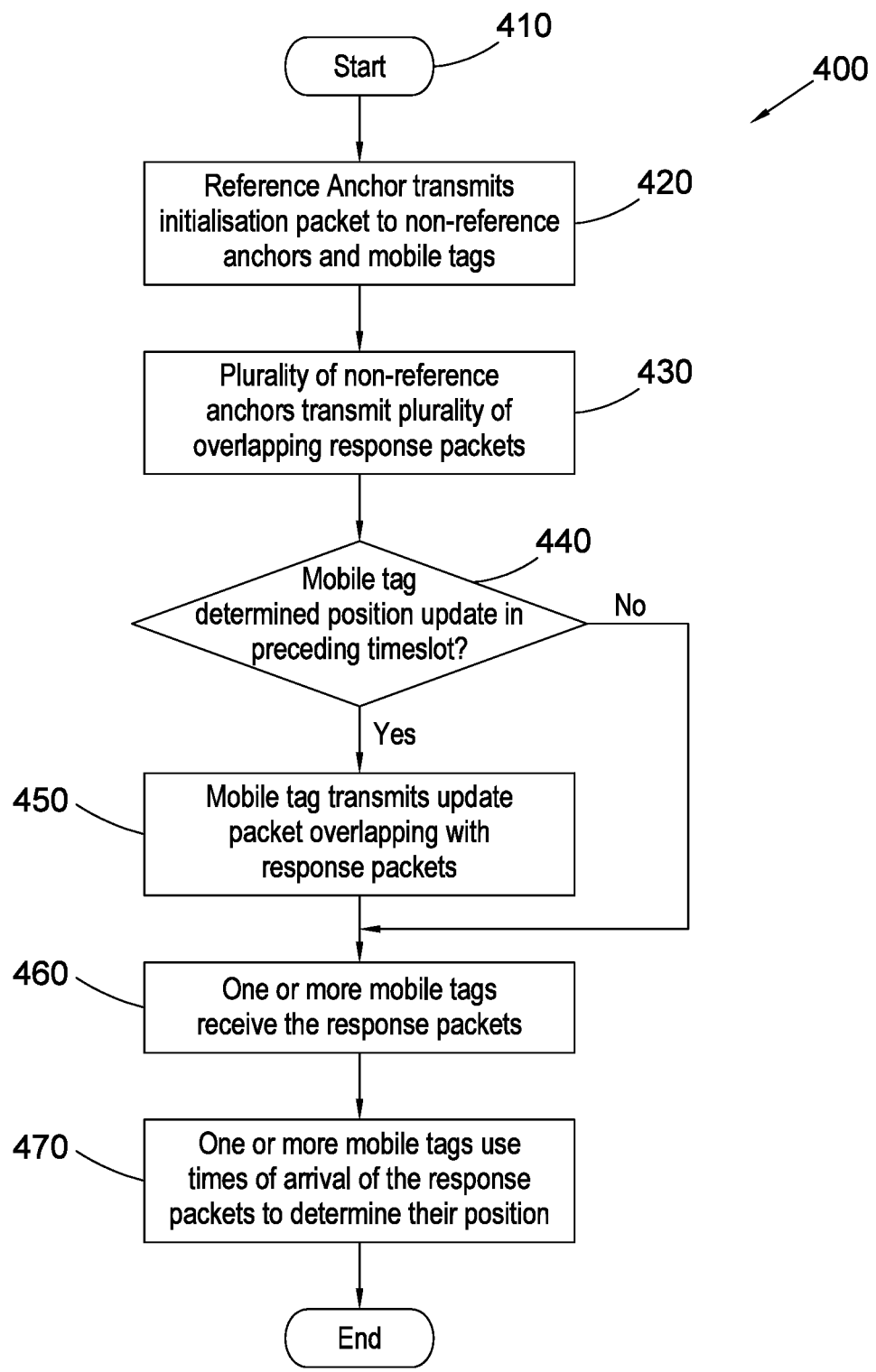
FIG. 4 is a flow chart of a first example embodiment of a method.

FIG. 4 is a flowchart of a timeslot of a first example embodiment of a localisation and communication method.

At the start 410 of the timeslot, a reference anchor transmits 420 an initialisation packet, which is received by a plurality of non-reference anchors and a plurality of mobile tags. The initialisation packet comprises a payload specifying the most recent locations of the plurality of mobile tags known to the reference anchor.

After the initialisation packet has been transmitted 420, the plurality of non-reference anchors transmit 430 a plurality of equally spaced overlapping localisation packets without payloads. Each localisation packet is transmitted 430 at a pre-set delay time after the transmission 420 of the initialisation packet that is associated with the non-reference anchor by which it is transmitted. The equal separation between the delay times is longer than a maximum expected localisation packet time of flight.

If 440, during an immediately preceding timeslot, one of the mobile tags determined that it has a position update, that tag transmits 450 an update packet overlapping with the plurality of localisation packets and comprising a payload containing the position update. The update packet is transmitted at a pre-set update time after the plurality of delay times, wherein the separation between the first pre-set delay time and the update time plus a maximum expected packet time of flight is less than the duration of a period for which a mobile tag measures its channel impulse response in a reception operation. If a tag transmits such an update packet 450 it does not listen to receive the localisation packets.

During the transmission 430 of the localisation packets and optional transmission 450 of an update packet, any of the mobile tags that do not transmit 450 an update packet listen to receive the plurality of localisation packets, and the reference anchor listens to receive the update packet. As the localisation packets and update packet overlap, but only the update packet includes a payload, the listening mobile tags and reference anchor can receive all the packets, including the payload of the update packet. As the packets' transmission times are separated by more than a maximum expected time of flight their times of arrival will not overlap and can be measured from the channel impulse response with which the packets were received.

Irrespective of whether an update packet is transmitted 450 overlapping with the localisation packets, one or more mobile tags receive 460 the plurality of localisation packets and use 470 their times of arrival to determine their position. The localisation packets being transmitted 430 at different times associated with their transmitting non-reference anchors allows their transmitting non-reference anchors and distance thereto to be identified from their times of arrival. The mobile tag then uses these distances to determine its location using multilateration. If a mobile tags determines a position that differs from its last known position to the reference anchor specified in the initialisation packet, it will transmit 450 an update packet comprising a payload with this position update in the next timeslot.

The method may comprise optional features as described above with reference to FIG. 2. For example, different timeslots may be assigned to different mobile tags to transmit update packets if they have a position update, in order to prevent interference due to multiple tags having simultaneous positon updates.

Figure 5A:
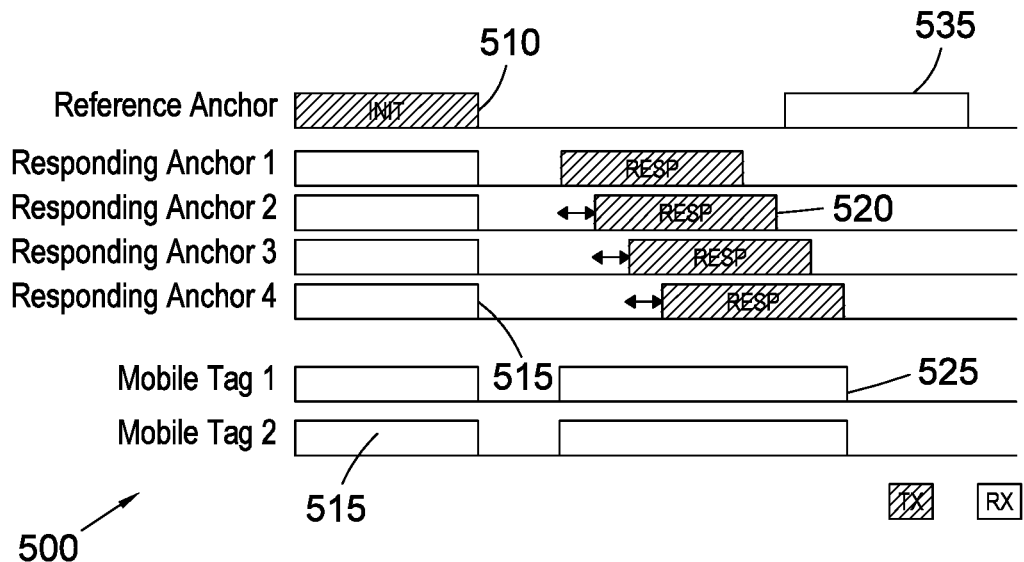
FIGS. 5a and 5b show first and second timeslots in which the method of FIG. 4 is performed.
Figure 5B:
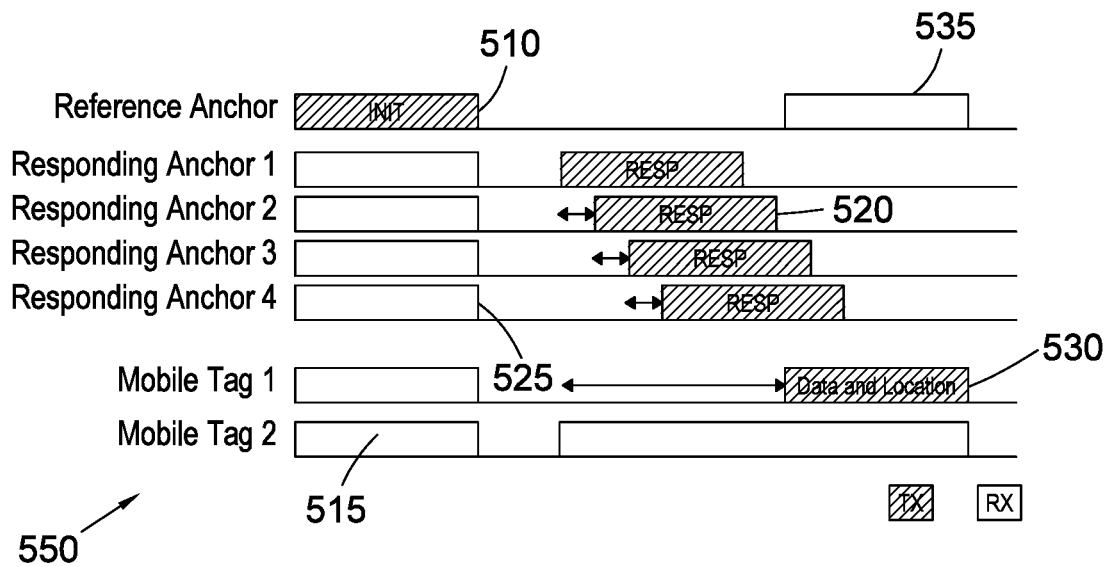

FIGS. 5a and 5b show first and second timeslots 500, 550 performed according to the method 400 described above with reference to FIG. 4.

In the first timeslot 500 shown in FIG. 5a, the reference anchor transmits an initialisation packet 510 that is listened for and received 515 by the four non-reference anchors and by two mobile tags. The four non-reference anchors then transmit closely time-separated overlapping localisation packets 520 while the two mobile tags and the reference anchor listen for and receive 525 the localisation packets 520. The two mobile tags use their measured times of arrival of the localisation packets 520 to determine their positions using multilateration. In the illustrated first timeslot 500 the first mobile tag determines a location that differs from its position transmitted in the payload of the initialisation packet 510, and the second mobile tag determines a position that matches its position specified in the initialisation packet 510. No update packet 530 is transmitted in the first timeslot, although the reference anchor listens 535 to receive any update packet 530 that would be transmitted.

In the second timeslot 550 shown in FIG. 5b, the reference anchor transmits an initialisation packet 510 that is listened for and received 515 by the four non-reference anchors and by two mobile tags. The four non-reference anchors then transmit closely time-separated overlapping localisation packets 520 while the first mobile tag transmits an overlapping update packet 530 with a payload containing its updated position. The reference anchor and the second mobile tag listen for and receive 535, 525 the localisation packets 520 and the update packet 530. The reference anchor updates it last known position of the first mobile tag based on the content of the update packet, and the second mobile tag uses its measured times of arrival of the localisation packets 520 to determine its position using multilateration.

FIG. 6 is a flowchart of a single iteration of a second example embodiment of a localisation and communication method performed within a single timeslot.

At the start 610 of the timeslot, a reference anchor transmits 620 an initialisation packet to a plurality of non-reference anchors and a plurality of mobile tags in the same manner as an initialisation packet is transmitted 420 in the first example method 400 described above with reference to FIG. 4.

Subsequently, if 630 the payload of the initialisation packet does not reflect a position update transmitted 685 by one of the mobile tags and received by one of the non-reference anchors in a preceding timeslot (indicating that the reference anchor did not receive the position-specifying transmission 670), the other non-reference anchors transmit 640 a plurality of time-separated but overlapping localisation packets without payloads, and the non-reference anchor that previously received the position update transmits 650 an update packet overlapping with the plurality of localisation packets and comprising a payload containing the position update.

If a plurality of the non-reference anchors received a position updated transmitted 685 by one of the mobile tags in a preceding timeslot, each of said plurality of non-reference anchors may substantially simultaneously transmit 650 the update packet, while the other non-reference anchors transmit 640 localisation packets.

In alternative embodiments, the system may be configured such that a maximum of one non-reference anchor transmits 650 the update packet. In other embodiments, the system may be configured such that at least a minimum number (such as three) of the non-reference anchors transmit 640 localisation packets rather than an update packet. These alternative embodiments may ensure that enough localisation packets are transmitted 650 to allow a mobile tag to localise 670 itself.

Otherwise, if no non-reference anchors received position specifying transmissions 685 in the preceding timeslot that include position updates not reflected in the payload of the initialisation packet, all of the non-reference anchors that received the initialisation packets transmit 645 a plurality of equally spaced overlapping localisation packets without payloads.

The localisation packets transmitted 640, 645 by some or all of the non-reference anchors are transmitted 640, 645 at pre-set delay times after the transmission 620 of the initialisation packet. The pre-set delay times are each associated with and used by one of the non-reference anchors and are separated by equal time offsets longer than a maximum expected localisation packet time of flight. However in the situation in which one of the non-reference anchor transmits 650 an update packet instead of a localisation packet, no localisation packet is transmitted at its associated pre-set delay time.

If an update packet is transmitted 650, it is transmitted at a pre-set update time after the plurality of delay times, wherein the separation between the first pre-set delay time and the update time plus a maximum expected packet time of flight is less than the duration of a period for which a mobile tag measures its channel impulse response in a reception operation.

During the transmission 640, 645 of the localisation packets and optional transmission 650 of an update packet, the mobile tags listen to receive the plurality of localisation packets, and the reference anchor listens to receive the update packet.

Irrespective of whether an update packet is transmitted 650 overlapping with the localisation packets, the plurality of mobile tags receive 660 the plurality of localisation packets and use 670 their times of arrival to determine their position in the same manner as in the first example method 400 described above with reference to FIG. 4c.

If 680 a mobile tag determines a position that differs from its last known position to the reference anchor specified in the initialisation packet, it transmits 685 a position-specifying packet comprising a payload with this position update at a pre-set time after the transmission 640, 645, 650 and receipt 660 of the overlapping localisation packets and optional update packet. The reference anchor and the plurality of non-reference anchors all listen to receive such a position-specifying packet. If the reference anchor receives such a position-specifying packet the position update contained therein will be reflected in the initialisation packet transmitted 620 in the next timeslot. After this step the method performed in the single timeslot ends 690, and is repeated in subsequent timeslot.

The method may comprise optional features as described above with reference to FIG. 2. For example, different timeslots may be assigned to different mobile tags to transmit position-specifying packets if they have a position update, in order to prevent interference due to multiple tags having simultaneous positon updates.

FIGS. 7a, 7b, and 7c show first, second and third timeslots performed according to the method 600 described above with reference to FIG. 6.

In the first timeslot shown in FIG. 7a, the reference anchor transmits an initialisation packet 710 that is listened for 715 and received by the four non-reference anchors and by two mobile tags. The four non-reference anchors then transmit closely time-separated overlapping localisation packets 720 while the two mobile tags and the reference anchor listen for 725, 735 and receive the localisation packets 720. No update packet 730 overlapping with the localisation packets 720 is transmitted.

The two mobile tags use their measured times of arrival of the localisation packets 720 to determine their positions using multilateration. In the illustrated first timeslot the first mobile tag determines a location that differs from its position transmitted in the payload of the initialisation packet 710, and the second mobile tag determines a position that matches its position specified in the initialisation packet 710. The first mobile tag therefore transmits a position-specifying packet 740 while the reference anchors and the non-reference anchors listen to receive it 745. The reference anchor successfully receives the position-specifying packet 740.

In the second timeslot shown in FIG. 7b, as the reference anchor successfully received the position-specifying packet 740 transmitted in the first timeslot, no update packet 730 is transmitted by any of the non-reference anchors. The initialisation packet 710 and the plurality of localisation packets 720 are transmitted and received in the same manner as in the first timeslot.

In the second timeslot, the second mobile tag determines a location different from its position specified in the initialisation packet 710 instead of the first mobile tag. Therefore, the second mobile tag transmits a position-specifying packet 740 while the reference anchor and the plurality of non-reference anchors listen 745 to receive it. In the illustrated second timeslot, the reference anchor does not successfully receive the position-specifying packet 740 but the third of the four reference anchors receives the position-specifying packet 740.

Therefore, the payload of the initialisation packet 710 transmitted in the third timeslot does not reflect the position update received by the third non-reference anchor in the preceding timeslot. The third non-reference anchor therefore transmits an update packet 730 at the pre-set update time instead of a localisation packet 720 at its associated pre-set delay time. The first, second and fourth non-reference anchors transmit localisation packets 720 and the reference anchor and the two mobile tags receive the update packet 730 and the localisation packets 720.

The two mobile tags determine their positions using multilateration. In the illustrated third timeslot, the two mobile tags have not moved since the second timeslot and therefore determine the same locations that they determined during the second timeslot. Therefore, the second mobile tag transmits a position-specifying packet 740.

FIG. 8 shows an example of an embodiment of a system 800 for localising mobile tags within an environment divided into a plurality of cells 810 (and optionally for communicating with such mobile tags). The system comprises a plurality of subsystems, each configured to cover one of the cells and to transmit localisation packets for localising a mobile tag within that cell (preferably from their times of arrival and/or time differences of arrival using multilateration).

Each of the subsystem may comprise a plurality of anchors. Each of the plurality of subsystems may be a system 100, 150 as described above with reference to FIGS. 1a and 1b and/or systems configured to perform localisation and communication operations 200, 400, 600 as described above. Alternatively, the systems may not be configured to transmit payload-carrying update packets overlapping with localisation packets and may omit features relating to do so. For example, each subsystem may comprise a plurality of anchors each configured to transmit a payload-less localisation packet at a time corresponding to its transmitting anchor, with the plurality of localisation packets being transmitted by different anchors at different times and overlapping with each other in time.

Each of the cells 810 is an area or volume of the environment. The cells together preferably define or span a contiguous area or volume. In some embodiments the cells may define a tiling. For example in the system 800 illustrated in FIG. 8 a square environment is divided into nine square cells 810 in a regular square tiling arrangement. It will be appreciated that some or all of the subsystems may be able and/or configured to localise tags within an area extending beyond the cell 810 that it covers. This may result in areas of overlap wherein mobile tags may be localised by multiple subsystems (for example, due to being within range of, and able to receive localisation packets transmitted by, anchors of multiple different subsystems, such as subsystems of adjacent cells 810).

Individual subsystems comprising a plurality of localisation packet transmitting anchors 120 (and optionally a single reference anchor 110) can only perform localisation (and optionally communication) operations in a limited area within range of their anchors. Therefore, in order to cover larger areas, such as the environment shown in FIG. 8, a system 800 comprising a plurality of such subsystems may be used, with each individual subsystem localising mobile tags within at least an individual cell 810.

The plurality of subsystems covering different cells preferably individually obtain local data (such as the locations of mobile tags 130 within their cells) and share their obtained local data with each other. For example, one or more anchors of each subsystem (such as a reference anchor 110) may periodically transmit data to be received by anchors of other subsystems (such as other subsystems' reference anchors). Other subsystem's anchors receiving this data may propagate this data to other subsystems (and/or reference anchors thereof), preferably using a flooding protocol. For example, a multi-hop flooding protocol such as Glossy (Ferrari, Federico et al. Proceedings of the $10^{th}$ ACM/IEEE International Conference on Information Processing in Sensor Networks, the entirety of which is herein incorporated by reference) may be used.

The plurality of subsystems, localisation packet transmitting anchors 120 thereof, and/or reference anchors 110 thereof are preferably time synchronised, preferably periodically and/or using a flooding protocol. For example, a multi-hop flooding protocol such as Glossy. This may advantageously allow mobile tags to be used with any of the different subsystems covering different cells.

Mobile tags 130 used with such a system 800 comprising multiple subsystems 100 are preferably configured to be localised using (and optionally to communicate with), any of the plurality of subsystems covering different cells 810. For example, mobile tags 130 may listen to receive localisation packets (and optionally initialisation packets and/or update packets) at times any of the plurality of subsystems transmit such packets, and at frequencies with which any such subsystems transmit such packets. This may advantageously allow moving tags to be continuously localised as they move between different cells 810 covered by different subsystems.

However, as mobile tags localise themselves relative to the known locations of the non-reference anchors of the subsystem which they interact, it is necessary for them to know with which of the subsystems they are interacting in order to accurately localise themselves.

Therefore, different subsystems transmit localisation packets at different frequencies. In some embodiments, the plurality of subsystems covering the different cells 810 are divided into multiple groups that operate using multiple different non-overlapping channels and/or frequencies. For example in FIG. 8, nine cells are divided into a first group comprising cells 1, 3, 5, 7 and 9 and a second group comprising cells 2, 4, 6, and 8 such that none of the cells shares a contiguous edge with a cell of another group. The subsystems covering the first group of cells use channel 1, with a centre frequency of 3494.4 MHz and a bandwidth of 499.2 MHz, and the subsystems covering the second group of cells use channel 3, with a centre frequency of 4492.8 MHz and a bandwidth of 499.2 MHz. The multiple channels not overlapping advantageously prevents interference between different subsystems covering different cells using different channels.

The mobile tags preferably use a higher bandwidth channel or range of frequencies overlapping the different channels and/or frequencies used by the subsystems covering different groups of cells. For example, in the arrangement shown in FIG. 8 the mobile tags may use channel 4, with a centre frequency 3993.6 MHz and bandwidth of 1331.2 MHz (although the maximum bandwidth the DW1000 UWB radios used in the system can receive is 900 MHz).

Some or all of the anchors, such as the reference anchors, of the different subsystems preferably communicate with each other (for example, to share data and/or for time synchronization) using a channel that does not overlap with any of the channels used for localisation by the different subsystems covering the different cells or mobile tags. For example, in the arrangement illustrated in FIG. 8 the reference anchors communicate with each other using channel 5 with a centre frequency of 6489.6 MHz and a bandwidth of 499.2 MHz.

The two groups of cells 810 are arranged such that the subsystems covering cells sharing contiguous edges operate using different channels. However, as shown in FIG. 8 it is still possible for a mobile tag 820 to move 825 between two different cells using the same channel. In this case, the tag 820 would not be able to differentiate between the two cells and would not reliably be able to determine its position.

Therefore, different subsystems covering different cells 810 may be configured to transmit localisation packets (and optionally initialisation, update and/or other packets) in different timeslots. For example, different subsystems in different cells may be configured to perform localisation (and optionally communication) operations or methods in different subsets of a sequence of timeslots, such as interleaved subsets.

FIG. 9 shows a system 900 comprising sixteen subsystems each covering one of sixteen different cells 910. In addition to the subsystems covering different cells 910 being divided into multiple groups that transmit localisation packets using multiple different non-overlapping channels or frequencies, they are also divided into different groups that transmit localisation packets in different timeslots.

In the arrangement illustrated in FIG. 9 the subsystems covering the cells 910 are divided between two different channels and two different alternating sequences of timeslots, with no cell being adjacent to another cell using the same combination of channel and timeslots. The cells 910 are divided into four groups in total, with cells 1, 3, 9 and 11 using channel 1 in first timeslots, cells 2, 4, 10 and 12 using channel 3 in the first timeslots, cells 5, 7, 13, and 15 using channel 3 in second timeslots, and cells 6, 8 14 and 16 using channel 1 in first timeslots.

FIG. 10 shows an embodiment of a device 1000 configured to perform steps of methods as described herein. The device comprises an ultra-wideband transceiver 1010, such as a Decawave® DW1000 UWB radio, with an aerial 1015, a processor 1020, and a memory 1030 storing computer instructions 1035. The device 1000 may be a reference anchor 110, non-reference anchor 120, or mobile tag 130 as described above.

The UWB transceiver 1010 is configured to transmit and receive signals via the UWB transceiver. The computer instructions 1035 are executable by the processor 1020 to cause the processor 1020 and/or the device 1000 to perform steps of a method as described above.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method for localizing mobile tags using a system comprising a plurality of anchors located at known locations, the method comprising:
   transmitting a plurality of ultra-wideband (UWB) localization packets using respective anchors of the plurality of anchors, wherein each of the plurality of localization packets is transmitted by a respective anchor of the plurality of anchors at a different respective delay time; and
   transmitting an update UWB packet with either an anchor of the plurality of anchors that does not transmit one of the localization packets, or with a mobile tag,
   wherein the localization packets comprise no payloads, the update packet comprises a payload, and
   wherein successive ones of the plurality of localization packets and the update packet overlap with each other in time.

2. The method according to claim 1, further comprising:
   receiving the plurality of localization packets at a mobile tag;
   determining the times of arrival of each of the plurality of localization packets at the mobile tag from respective channel impulse response peaks with which the plurality of localization packets were received at the mobile tag;
   identifying which of the plurality of anchors transmitted each of the plurality of localization packets based on at least one of the order in which the plurality of localization packets were received by the mobile tag or time windows in which the plurality of localization packets were received by the mobile tag; and
   using the times of arrival or time differences of arrival of the plurality of localization packets and known locations of the anchors to determine the location of the mobile tag using multilateration.

3. The method according to claim 1, wherein the respective delay times at which the plurality of localization packets are transmitted by respective anchors are separated from each other by at least a time offset equal to a distance between two anchors of the plurality of anchors divided by the speed of light.

4. The method according to claim 2, wherein the update packet is transmitted after the plurality of localization packets.

5. The method according to claim 4, wherein a separation in time between the transmission of the earliest of the plurality of localisation localization packets and the transmission of the update packet is less than a period for which the mobile tag measures its channel impulse response when receiving the overlapping localisation localization packets and update packet.

6. The method according to claim 1,
   wherein an anchor of the plurality of anchors is a reference anchor,
   the method further comprising transmitting an UWB initialisation initialization packet with the reference anchor before the transmission of the plurality of localization packets and the update packet,
   wherein the initialization packet is received by each of the plurality of anchors that transmit respective localization packets, and by the anchor or mobile tag that transmits the update packet.

7. The method according to claim 6,
   wherein the system includes one or more mobile tags and, if the update packet is transmitted with a mobile tag, it is transmitted by one of said one or more mobile tags,
   wherein the initialization packet comprises a payload including information identifying a most recent position known to the reference anchor of at least one of the one or more mobile tags, and
   wherein the payload of the update packet includes information identifying a position of at least one of the one or more mobile tags that is not identified in the information of the payload of the initialization packet.

8. The method according to claim 7,
   wherein the at least one of the plurality of anchors and the one or more mobile tags receives the initialization packet, determines whether it knows a position of a mobile tag of the one or more mobile tags that is not indicated in the payload of the initialization packet, and if it does know a position of a mobile tag of the one or more mobile tags that is not indicated in the payload of the initialization packet, transmit the update packet, and wherein the payload comprised by the update packet contains information indicating said position.

9. The method according to claim 7,
wherein the initialization packet is received by at least one of the one or more mobile tags, and
wherein the update packet is transmitted by at least one of the one or more mobile tags which determined its position in a previous timeslot.

10. The method according to claim 7, wherein the update packet is transmitted by one of the anchors of the plurality of anchors which received a position update transmitted by a mobile tag of the one or more mobile tags in a previous timeslot.

11. A system for localizing mobile tags, comprising:
a plurality of anchors positioned at known locations configured to transmit respective ultra-wideband (UWB) localization packets at different respective delay times; and
one or more mobile tags configured to receive the localization packets,
wherein at least one of the one or more mobile tags is configured to transmit an update packet instead of receiving the localization packets and/or at least one of a plurality of non-reference anchors is configured to transmit an update packet instead of transmitting one of the localization packets,
wherein the localization packets comprise no payloads, the update packet comprises a payload, and
wherein successive ones of the plurality of localization packets and the update packet overlap with each other in time.

12. The system according to claim 11, wherein the one or more mobile tags are further configured to:
determine the times of arrival of each of the plurality of localization packets at the mobile tag from respective channel impulse response peaks with which the plurality of localization packets were received at the mobile tag,
identify which of the plurality of anchors transmitted each of the plurality of localization packets based on at least one of the order in which the plurality of localization packets were received by the mobile tag or time windows in which the plurality of localization packets were received by the mobile tag, and
use the times of arrival or time differences of arrival of the plurality of localization packets and known locations of the anchors to determine the location of the mobile tag using multilateration.

13. The system according to claim 11, wherein the respective delay times at which the plurality of anchors are configured to transmit the respective localization packets are separated from each other by at least a time offset equal to a distance between two anchors of the plurality of anchors divided by the speed of light.

14. The system according to claim 11,
wherein the at least one of the one or more mobile tags and/or of the plurality of non-reference anchors is further configured to transmit the update packet after the respective delay times, and
wherein a separation in time between the transmission of the earliest of the plurality of localization packets and the transmission of the update packet is less than a period for which the mobile tags measures their channel impulse response when receiving the overlapping localization packets and update packet.

15. The system according to claim 11,
further comprising a reference anchor configured to transmit a UWB initialization packet before the transmission of the plurality of localization packets and the update packet,
wherein other anchors of the plurality of anchors and the one or more mobile tags are configured to receive the initialization packet.

16. The system according to claim 15,
wherein the initialization packet comprises a payload including information identifying a most recent position known to the reference anchor of at least one of the one or more mobile tags, and
wherein the payload of the update packet includes information identifying a position of at least one of the one or more mobile tags that is not identified in the information of the payload of the initialization packet.

17. The system according to claim 16, wherein at least one of the plurality of anchors and the one or more mobile tags is further configured to receive the initialization packet, determine whether it knows a position of a mobile tag of the one or more mobile tags that is not indicated in the payload of the initialization packet, and if it does know a position of a mobile tag of the one or more mobile tags that is not indicated in the payload of the initialization packet, transmit the update packet, wherein the payload comprised by the update packet contains information indicating said position.

18. The system according to claim 16, wherein at least one of the one or more mobile tags is further configured to receive the initialization packet and to transmit update packet after having determined its position during a previous timeslot.

19. The system according to claim 16, wherein at least one of the plurality of anchors is further configured to receive the initialization packet and to transmit the update packet after having received a position update transmitted by a mobile tag of the one or more mobile tags transmitted during a previous timeslot.

20. A method for localizing mobile tags within an environment divided into a plurality of cells, the method comprising: transmitting a plurality of ultra-wideband (UWB) localization packets with respective anchors of each of a plurality subsystems, each covering one of the cells, wherein the localization packets transmitted by each subsystem are for localizing a mobile tag within the cell covered by that subsystem using multilateration, and wherein different subsystems transmit localization packets at different frequencies.

* * * * *